(12) United States Patent
Yamaguchi et al.

(10) Patent No.: US 9,584,699 B2
(45) Date of Patent: Feb. 28, 2017

(54) IMAGE PROCESSING APPARATUS, IMAGE PROCESSING METHOD AND COMPUTER-READABLE STORAGE MEDIUM WITH IMPROVED CHARACTER DISPLAY

(75) Inventors: Tomohiro Yamaguchi, Shinshiro (JP); Hideyuki Toriyama, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 535 days.

(21) Appl. No.: 13/358,294

(22) Filed: Jan. 25, 2012

(65) Prior Publication Data

US 2012/0188276 A1    Jul. 26, 2012

(30) Foreign Application Priority Data

Jan. 25, 2011    (JP) ................................ 2011-012816

(51) Int. Cl.
| | |
|---|---|
| *G06T 11/00* | (2006.01) |
| *H04N 1/405* | (2006.01) |
| *H04N 1/58* | (2006.01) |
| *G06K 15/02* | (2006.01) |
| *H04N 1/409* | (2006.01) |

(52) U.S. Cl.
CPC ....... *H04N 1/4058* (2013.01); *G06K 15/1876* (2013.01); *H04N 1/4092* (2013.01); *H04N 1/58* (2013.01)

(58) Field of Classification Search
None
See application file for complete search history.

(56) References Cited

U.S. PATENT DOCUMENTS

| | | | | |
|---|---|---|---|---|
| 6,317,525 | B1* | 11/2001 | Aleksic et al. | 382/299 |
| 6,731,400 | B1* | 5/2004 | Nakamura et al. | 358/1.9 |
| 8,059,135 | B2* | 11/2011 | Naganuma | 345/597 |
| 2005/0031203 | A1 | 2/2005 | Fukuda | |
| 2006/0087694 | A1* | 4/2006 | Purdum | H04N 1/4058 358/3.2 |

(Continued)

FOREIGN PATENT DOCUMENTS

| | | |
|---|---|---|
| CN | 1581924 A | 2/2005 |
| CN | 101197912 A | 6/2008 |

(Continued)

OTHER PUBLICATIONS

Notice of Reasons for Refusal mailed Apr. 30, 2013, directed to JP Application No. 2011-012816; 4 pages.

(Continued)

*Primary Examiner* — William Beutel
(74) *Attorney, Agent, or Firm* — Buchanan Ingersoll & Rooney PC

(57) ABSTRACT

An image processing apparatus includes a first screen processing unit that performs first screen processing using a first screen angle on a line region of a character, a second screen processing unit that performs second screen processing using a second screen angle on at least an outline region out of the line region, the second screen angle being different from the first screen angle, and a composition unit that performs composition of a processing result of the first screen processing and a processing result of the second screen processing, on at least the outline region out of the line region.

8 Claims, 42 Drawing Sheets

(56) References Cited

U.S. PATENT DOCUMENTS

| | | | |
|---|---|---|---|
| 2006/0187234 A1* | 8/2006 | Deng et al. | 345/592 |
| 2006/0221080 A1* | 10/2006 | Iwata et al. | 345/469.1 |
| 2007/0070425 A1* | 3/2007 | Lane | 358/3.06 |
| 2008/0018938 A1* | 1/2008 | Lee | 358/3.06 |
| 2008/0137962 A1 | 6/2008 | Asano et al. | |
| 2008/0180475 A1* | 7/2008 | Eldar | H04N 1/405 347/13 |
| 2011/0135011 A1* | 6/2011 | Eddy et al. | 375/240.29 |

FOREIGN PATENT DOCUMENTS

| | | |
|---|---|---|
| CN | 100505822 C | 6/2009 |
| JP | 2006-261764 | 9/2006 |
| JP | 2008-219472 | 9/2008 |
| JP | 2008-294608 | 12/2008 |
| JP | 2008-294609 | 12/2008 |
| JP | 2009-111815 | 5/2009 |
| JP | 2010-192952 | 9/2010 |

OTHER PUBLICATIONS

Decision to Grant a Patent mailed Aug. 6, 2013, directed to Japanese Application No. 2011-012816; 5 pages.

Office Action issued on Jul. 3, 2014, by the Chinese Patent Office in corresponding Chinese Patent Application No. 201210017231.4, and an English Translation of the Office Action. (12 pages).

* cited by examiner

<BEFORE IMPROVEMENT>

<AFTER IMPROVEMENT>

SCREEN PROCESSING RESULT IN
UNIFORM REGION
(INPUT GRADATION VALUE = 0)

| 191 | 207 | 223 | 239 | 191 | 207 | 223 | 239 |
|---|---|---|---|---|---|---|---|
| 0 | 16 | 32 | 48 | 0 | 16 | 32 | 48 |
| 64 | 80 | 96 | 112 | 64 | 80 | 96 | 112 |
| 128 | 143 | 159 | 175 | 128 | 143 | 159 | 175 |
| 191 | 207 | 223 | 239 | 191 | 207 | 223 | 239 |
| 0 | 16 | 32 | 48 | 0 | 16 | 32 | 48 |
| 64 | 80 | 96 | 112 | 64 | 80 | 96 | 112 |
| 128 | 143 | 159 | 175 | 128 | 143 | 159 | 175 |

SCREEN PROCESSING RESULT IN
UNIFORM REGION
(INPUT GRADATION VALUE = 20)

| 191 | 207 | 223 | 239 | 191 | 207 | 223 | 239 |
|---|---|---|---|---|---|---|---|
| 0 | 16 | 32 | 48 | 0 | 16 | 32 | 48 |
| 64 | 80 | 96 | 112 | 64 | 80 | 96 | 112 |
| 128 | 143 | 159 | 175 | 128 | 143 | 159 | 175 |
| 191 | 207 | 223 | 239 | 191 | 207 | 223 | 239 |
| 0 | 16 | 32 | 48 | 0 | 16 | 32 | 48 |
| 64 | 80 | 96 | 112 | 64 | 80 | 96 | 112 |
| 128 | 143 | 159 | 175 | 128 | 143 | 159 | 175 |

Fig.11

<INPUT GRADATION VALUE = 20>

| 20 | 20 | 20 | 20 | 20 | 20 | 20 | 20 |
|----|----|----|----|----|----|----|----|
| 20 | 20 | 20 | 20 | 20 | 20 | 20 | 20 |
| 20 | 20 | 20 | 20 | 20 | 20 | 20 | 20 |
| 20 | 20 | 20 | 20 | 20 | 20 | 20 | 20 |
| 20 | 20 | 20 | 20 | 20 | 20 | 20 | 20 |
| 20 | 20 | 20 | 20 | 20 | 20 | 20 | 20 |
| 20 | 20 | 20 | 20 | 20 | 20 | 20 | 20 |
| 20 | 20 | 20 | 20 | 20 | 20 | 20 | 20 |

Fig.12

SCREEN PROCESSING RESULT IN
UNIFORM REGION
(INPUT GRADATION VALUE = 20)

| 0  | 0 | 0 | 0 | 0  | 0 | 0 | 0 |
|----|---|---|---|----|---|---|---|
| 16 | 4 | 0 | 0 | 16 | 4 | 0 | 0 |
| 0  | 0 | 0 | 0 | 0  | 0 | 0 | 0 |
| 0  | 0 | 0 | 0 | 0  | 0 | 0 | 0 |
| 0  | 0 | 0 | 0 | 0  | 0 | 0 | 0 |
| 16 | 4 | 0 | 0 | 16 | 4 | 0 | 0 |
| 0  | 0 | 0 | 0 | 0  | 0 | 0 | 0 |
| 0  | 0 | 0 | 0 | 0  | 0 | 0 | 0 |

Fig.13

SCREEN PROCESSING RESULT IN
UNIFORM REGION
(INPUT GRADATION VALUE = 64)

| 191 | 207 | 223 | 239 | 191 | 207 | 223 | 239 |
|-----|-----|-----|-----|-----|-----|-----|-----|
| 0   | 16  | 32  | 48  | 0   | 16  | 32  | 48  |
| 64  | 80  | 96  | 112 | 64  | 80  | 96  | 112 |
| 128 | 143 | 159 | 175 | 128 | 143 | 159 | 175 |
| 191 | 207 | 223 | 239 | 191 | 207 | 223 | 239 |
| 0   | 16  | 32  | 48  | 0   | 16  | 32  | 48  |
| 64  | 80  | 96  | 112 | 64  | 80  | 96  | 112 |
| 128 | 143 | 159 | 175 | 128 | 143 | 159 | 175 |

Fig.14

SCREEN PROCESSING RESULT IN
UNIFORM REGION
(INPUT GRADATION VALUE = 64)

| 0  | 0  | 0  | 0  | 0  | 0  | 0  | 0  |
|----|----|----|----|----|----|----|----|
| 16 | 16 | 16 | 16 | 16 | 16 | 16 | 16 |
| 0  | 0  | 0  | 0  | 0  | 0  | 0  | 0  |
| 0  | 0  | 0  | 0  | 0  | 0  | 0  | 0  |
| 0  | 0  | 0  | 0  | 0  | 0  | 0  | 0  |
| 16 | 16 | 16 | 16 | 16 | 16 | 16 | 16 |
| 0  | 0  | 0  | 0  | 0  | 0  | 0  | 0  |
| 0  | 0  | 0  | 0  | 0  | 0  | 0  | 0  |

Fig. 15

SCREEN PROCESSING RESULT IN
UNIFORM REGION
(INPUT GRADATION VALUE = 150)

| 191 | 207 | 223 | 239 | 191 | 207 | 223 | 239 |
|---|---|---|---|---|---|---|---|
| 0 | 16 | 32 | 48 | 0 | 16 | 32 | 48 |
| 64 | 80 | 96 | 112 | 64 | 80 | 96 | 112 |
| 128 | 143 | 159 | 175 | 128 | 143 | 159 | 175 |
| 191 | 207 | 223 | 239 | 191 | 207 | 223 | 239 |
| 0 | 16 | 32 | 48 | 0 | 16 | 32 | 48 |
| 64 | 80 | 96 | 112 | 64 | 80 | 96 | 112 |
| 128 | 143 | 159 | 175 | 128 | 143 | 159 | 175 |

Fig. 16

SCREEN PROCESSING RESULT IN
UNIFORM REGION
(INPUT GRADATION VALUE = 150)

| 0 | 0 | 0 | 0 | 0 | 0 | 0 | 0 |
|---|---|---|---|---|---|---|---|
| 16 | 16 | 16 | 16 | 16 | 16 | 16 | 16 |
| 16 | 16 | 16 | 16 | 16 | 16 | 16 | 16 |
| 16 | 7 | 0 | 0 | 16 | 7 | 0 | 0 |
| 0 | 0 | 0 | 0 | 0 | 0 | 0 | 0 |
| 16 | 16 | 16 | 16 | 16 | 16 | 16 | 16 |
| 16 | 16 | 16 | 16 | 16 | 16 | 16 | 16 |
| 16 | 7 | 0 | 0 | 16 | 7 | 0 | 0 |

Fig.17

SCREEN PROCESSING RESULT IN
UNIFORM REGION
(INPUT GRADATION VALUE = 255)

| 191 | 207 | 223 | 239 | 191 | 207 | 223 | 239 |
|---|---|---|---|---|---|---|---|
| 0 | 16 | 32 | 48 | 0 | 16 | 32 | 48 |
| 64 | 80 | 96 | 112 | 64 | 80 | 96 | 112 |
| 128 | 143 | 159 | 175 | 128 | 143 | 159 | 175 |
| 191 | 207 | 223 | 239 | 191 | 207 | 223 | 239 |
| 0 | 16 | 32 | 48 | 0 | 16 | 32 | 48 |
| 64 | 80 | 96 | 112 | 64 | 80 | 96 | 112 |
| 128 | 143 | 159 | 175 | 128 | 143 | 159 | 175 |

Fig.18

SCREEN PROCESSING RESULT IN
UNIFORM REGION
(INPUT GRADATION VALUE = 255)

| 16 | 16 | 16 | 16 | 16 | 16 | 16 | 16 |
|---|---|---|---|---|---|---|---|
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |

Fig.20

<INPUT GRADATION VALUE = 64>

Fig.23

SCREEN PROCESSING RESULT IN
UNIFORM REGION
(INPUT GRADATION VALUE = 64)

| 239 | 48 | 112 | 175 | 239 | 48 | 112 | 175 |
|-----|----|-----|-----|-----|----|-----|-----|
| 223 | 32 | 96  | 159 | 223 | 32 | 96  | 159 |
| 207 | 16 | 80  | 143 | 207 | 16 | 80  | 143 |
| 191 | 0  | 64  | 128 | 191 | 0  | 64  | 128 |
| 239 | 48 | 112 | 175 | 239 | 48 | 112 | 175 |
| 223 | 32 | 96  | 159 | 223 | 32 | 96  | 159 |
| 207 | 16 | 80  | 143 | 207 | 16 | 80  | 143 |
| 191 | 0  | 64  | 128 | 191 | 0  | 64  | 128 |

Fig.24

SCREEN PROCESSING RESULT IN
UNIFORM REGION
(INPUT GRADATION VALUE = 64)

| 0 | 16 | 0 | 0 | 0 | 16 | 0 | 0 |
|---|----|---|---|---|----|---|---|
| 0 | 16 | 0 | 0 | 0 | 16 | 0 | 0 |
| 0 | 16 | 0 | 0 | 0 | 16 | 0 | 0 |
| 0 | 16 | 0 | 0 | 0 | 16 | 0 | 0 |
| 0 | 16 | 0 | 0 | 0 | 16 | 0 | 0 |
| 0 | 16 | 0 | 0 | 0 | 16 | 0 | 0 |
| 0 | 16 | 0 | 0 | 0 | 16 | 0 | 0 |
| 0 | 16 | 0 | 0 | 0 | 16 | 0 | 0 |

<INPUT GRADATION VALUE = 64>

Fig.29  <INPUT GRADATION VALUE = 64>

Fig.30

⟨INPUT GRADATION VALUE = 64⟩

| 4 | 4 | 4 | 4 | 4 | 4 | 4 | 4 |
|---|---|---|---|---|---|---|---|
| 4 | 4 | 4 | 4 | 4 | 4 | 4 | 4 |
| 4 | 4 | 4 | 4 | 4 | 4 | 4 | 4 |
| 4 | 4 | 4 | 4 | 4 | 4 | 4 | 4 |
| 4 | 4 | 4 | 4 | 4 | 4 | 4 | 4 |
| 4 | 4 | 4 | 4 | 4 | 4 | 4 | 4 |
| 4 | 4 | 4 | 4 | 4 | 4 | 4 | 4 |
| 4 | 4 | 4 | 4 | 4 | 4 | 4 | 4 |

Fig.33

SCREEN PROCESSING RESULT IN
UNIFORM REGION
(INPUT GRADATION VALUE = 4)

| 12 | 13 | 14 | 15 | 12 | 13 | 14 | 15 |
|----|----|----|----|----|----|----|----|
| 0  | 1  | 2  | 3  | 0  | 1  | 2  | 3  |
| 4  | 5  | 6  | 7  | 4  | 5  | 6  | 7  |
| 8  | 9  | 10 | 11 | 8  | 9  | 10 | 11 |
| 12 | 13 | 14 | 15 | 12 | 13 | 14 | 15 |
| 0  | 1  | 2  | 3  | 0  | 1  | 2  | 3  |
| 4  | 5  | 6  | 7  | 4  | 5  | 6  | 7  |
| 8  | 9  | 10 | 11 | 8  | 9  | 10 | 11 |

| 0 | 0 | 0 | 0 | 0 | 0 | 0 | 0 | 1 |
|---|---|---|---|---|---|---|---|---|
| 0 | 0 | 0 | 0 | 0 | 0 | 0 | 1 | 0 |
| 0 | 0 | 0 | 0 | 0 | 0 | 1 | 0 | 0 |
| 0 | 0 | 0 | 0 | 0 | 1 | 0 | 0 | 0 |
| 0 | 0 | 0 | 0 | 1 | 0 | 0 | 0 | 0 |
| 0 | 0 | 0 | 1 | 0 | 0 | 0 | 0 | 0 |
| 0 | 0 | 1 | 0 | 0 | 0 | 0 | 0 | 0 |
| 0 | 1 | 0 | 0 | 0 | 0 | 0 | 0 | 0 |
| 1 | 0 | 0 | 0 | 0 | 0 | 0 | 0 | 0 |

*Fig.44*

<INPUT GRADATION VALUE = 30>

| 30 | 30 | 30 | 30 | 30 | 30 | 30 | 30 |
|----|----|----|----|----|----|----|----|
| 30 | 30 | 30 | 30 | 30 | 30 | 30 | 30 |
| 30 | 30 | 30 | 30 | 30 | 30 | 30 | 30 |
| 30 | 30 | 30 | 30 | 30 | 30 | 30 | 30 |
| 30 | 30 | 30 | 30 | 30 | 30 | 30 | 30 |
| 30 | 30 | 30 | 30 | 30 | 30 | 30 | 30 |
| 30 | 30 | 30 | 30 | 30 | 30 | 30 | 30 |
| 30 | 30 | 30 | 30 | 30 | 30 | 30 | 30 |

Fig.45

<INPUT GRADATION VALUE = 30>

| 191 | 207 | 223 | 239 | 191 | 207 | 223 | 239 |
|-----|-----|-----|-----|-----|-----|-----|-----|
| 0   | 16  | 32  | 48  | 0   | 16  | 32  | 48  |
| 64  | 80  | 96  | 112 | 64  | 80  | 96  | 112 |
| 128 | 143 | 159 | 175 | 128 | 143 | 159 | 175 |
| 191 | 207 | 223 | 239 | 191 | 207 | 223 | 239 |
| 0   | 16  | 32  | 48  | 0   | 16  | 32  | 48  |
| 64  | 80  | 96  | 112 | 64  | 80  | 96  | 112 |
| 128 | 143 | 159 | 175 | 128 | 143 | 159 | 175 |

Fig.46

| 239 | 48  | 112 | 175 | 239 | 48  | 112 | 175 |
|-----|-----|-----|-----|-----|-----|-----|-----|
| 223 | 32  | 96  | 159 | 223 | 32  | 96  | 159 |
| 207 | 16  | 80  | 143 | 207 | 16  | 80  | 143 |
| 191 | 0   | 64  | 128 | 191 | 0   | 64  | 128 |
| 239 | 48  | 112 | 175 | 239 | 48  | 112 | 175 |
| 223 | 32  | 96  | 159 | 223 | 32  | 96  | 159 |
| 207 | 16  | 80  | 143 | 207 | 16  | 80  | 143 |
| 191 | 0   | 64  | 128 | 191 | 0   | 64  | 128 |

Fig.47

<INPUT GRADATION VALUE = 30>

| 30 | 30 | 30 | 30 | 30 | 30 | 30 | 30 |
|----|----|----|----|----|----|----|----|
| 30 | 30 | 30 | 30 | 30 | 30 | 30 | 30 |
| 30 | 30 | 30 | 30 | 30 | 30 | 30 | 30 |
| 30 | 30 | 30 | 30 | 30 | 30 | 30 | 30 |
| 30 | 30 | 30 | 30 | 30 | 30 | 30 | 30 |
| 30 | 30 | 30 | 30 | 30 | 30 | 30 | 30 |
| 30 | 30 | 30 | 30 | 30 | 30 | 30 | 30 |
| 30 | 30 | 30 | 30 | 30 | 30 | 30 | 30 |

| 0 | 40 | 80 | 120 | 128 | 167 | 207 | 247 |
|---|---|---|---|---|---|---|---|
| 223 | 8 | 48 | 88 | 96 | 135 | 175 | 215 |
| 191 | 231 | 16 | 56 | 64 | 104 | 143 | 183 |
| 159 | 199 | 239 | 24 | 32 | 72 | 112 | 151 |
| 128 | 167 | 207 | 247 | 0 | 40 | 80 | 120 |
| 96 | 135 | 175 | 215 | 223 | 8 | 48 | 88 |
| 64 | 104 | 143 | 183 | 191 | 231 | 16 | 56 |
| 32 | 72 | 112 | 151 | 159 | 199 | 239 | 24 |

Fig.49

| 0 | 40 | 80 | 120 | 128 | 167 | 207 | 247 |
|---|---|---|---|---|---|---|---|
| 223 | 8 | 48 | 88 | 96 | 135 | 175 | 215 |
| 191 | 231 | 16 | 56 | 64 | 104 | 143 | 183 |
| 159 | 199 | 239 | 24 | 32 | 72 | 112 | 151 |
| 128 | 167 | 207 | 247 | 0 | 40 | 80 | 120 |
| 96 | 135 | 175 | 215 | 223 | 8 | 48 | 88 |
| 64 | 104 | 143 | 183 | 191 | 231 | 16 | 56 |
| 32 | 72 | 112 | 151 | 159 | 199 | 239 | 24 |

Fig.50

| 0 | 40 | 80 | 120 | 128 | 167 | 207 | 247 |
|---|---|---|---|---|---|---|---|
| 223 | 8 | 48 | 88 | 96 | 135 | 175 | 215 |
| 191 | 231 | 16 | 56 | 64 | 104 | 143 | 183 |
| 159 | 199 | 239 | 24 | 32 | 72 | 112 | 151 |
| 128 | 167 | 207 | 247 | 0 | 40 | 80 | 120 |
| 96 | 135 | 175 | 215 | 223 | 8 | 48 | 88 |
| 64 | 104 | 143 | 183 | 191 | 231 | 16 | 56 |
| 32 | 72 | 112 | 151 | 159 | 199 | 239 | 24 |

Fig.51

| 0 | 40 | 80 | 120 | 128 | 167 | 207 | 247 |
|---|---|---|---|---|---|---|---|
| 223 | 8 | 48 | 88 | 96 | 135 | 175 | 215 |
| 191 | 231 | 16 | 56 | 64 | 104 | 143 | 183 |
| 159 | 199 | 239 | 24 | 32 | 72 | 112 | 151 |
| 128 | 167 | 207 | 247 | 0 | 40 | 80 | 120 |
| 96 | 135 | 175 | 215 | 223 | 8 | 48 | 88 |
| 64 | 104 | 143 | 183 | 191 | 231 | 16 | 56 |
| 32 | 72 | 112 | 151 | 159 | 199 | 239 | 24 |

IMAGE PROCESSING APPARATUS, IMAGE PROCESSING METHOD AND COMPUTER-READABLE STORAGE MEDIUM WITH IMPROVED CHARACTER DISPLAY

This application is based on Japanese Patent Application No. 2011-012816 filed on Jan. 25, 2011, the contents of which are hereby incorporated by reference.

BACKGROUND OF THE INVENTION

Technical Field

The present invention relates to an image processing technique and in particular to an image processing technique involving screen processing.

Related Art

There are techniques for representing halftones by performing screen processing (dithering).

In the case of representing characters using such a technique, "jagged edges" (jaggies) may appear in character outlines if the directions in which the character outlines extend and the direction in which a screen is oriented (the direction corresponding to a predetermined screen angle) are close to parallel to each other.

As a technique for reducing such jagged edges, there is, for example, a technique disclosed in JP 2008-294609A.

JP 2008-294609A discloses that the font of a character is analyzed, and if a difference between a line segment angle of the font and the screen angle is less than or equal to a threshold value, it is determined that jaggies will appear, and every screen for each color is rotated by 90 degrees to generate an output image.

With the above-described technique disclosed in JP 2008-294609A, screen processing using a new screen angle obtained by rotating the original screen angle by 90 degrees is performed on each page. More specifically, an angle obtained by 90-degree rotation of a character angle that has the highest frequency of appearance on each page is determined as a new screen angle, and screen processing using the new screen angle is uniformly performed on all characters on that page.

Accordingly, the above technique does have the effect of reducing jaggies in line segments having a predetermined angle on each page (specifically, a character angle with the highest frequency of appearance on that page).

However, because there are line segments of various angles on each page, jaggies may not be reduced in other line segments whose angles are different from the above predetermined angle.

SUMMARY OF THE INVENTION

It is an object of the present invention to provide a technique that enables jaggies appearing in character outlines having various angles to be suppressed.

According to a first aspect of the present invention, an image processing apparatus includes a first screen processing unit that performs first screen processing using a first screen angle on a line region of a character, a second screen processing unit that performs second screen processing using a second screen angle on at least an outline region out of the line region, the second screen angle being different from the first screen angle, and a composition unit that performs composition of a processing result of the first screen processing and a processing result of the second screen processing, on at least the outline region out of the line region.

According to a second aspect of the present invention, an image processing method includes the steps of a) performing first screen processing using a first screen angle on a line region of a character, b) performing second screen processing using a second screen angle on at least an outline region out of the line region, the second screen angle being different from the first screen angle, and c) performing composition of a processing result of the first screen processing and a processing result of the second screen processing, on at least the outline region out of the line region.

According to a third aspect of the present invention, a non-transitory computer-readable storage medium storing a program for causing a computer to execute the steps of a) performing first screen processing using a first screen angle on a line region of a character, b) performing second screen processing using a second screen angle on at least an outline region out of the line region, the second screen angle being different from the first screen angle, and c) performing composition of a processing result of the first screen processing and a processing result of the second screen processing, on at least the outline region out of the line region.

According to a fourth aspect of the present invention, an image processing apparatus includes a detection unit that detects a tilt angle of an outline region of a line region of a character, a selection unit that selects a screen angle whose difference from the tilt angle is closest to a predetermined angle, from among a plurality of screen angles, and a screen processing unit that performs screen processing using the screen angle selected from among the plurality of screen angles on at least the outline region out of the line region of the character.

According to a fifth aspect of the present invention, an image processing method comprising the steps of a) detecting a tilt angle of an outline region of a line region of a character, b) selecting a screen angle whose difference from the tilt angle is closest to a predetermined angle, from among a plurality of screen angles, and c) performing screen processing using the screen angle selected from among the plurality of screen angles on at least the outline region out of the line region of the character.

According to a sixth aspect of the present invention, a non-transitory computer-readable storage medium storing a program for causing a computer to execute the steps of a) detecting a tilt angle of an outline region of a line region of a character, b) selecting a screen angle whose difference from the tilt angle is closest to a predetermined angle, from among a plurality of screen angles, and c) performing screen processing using the screen angle selected from among the plurality of screen angles on at least the outline region out of the line region of the character.

These and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a diagram showing the result of screen processing performed on a gradation value of "0".

FIG. 10 is a diagram showing the result of screen processing performed on an intermediate gradation value of "20".

FIG. 11 is a diagram showing an input pixel group having an intermediate gradation value of "20" and forming a uniform region.

FIG. 12 is a diagram showing the result of screen processing performed on an intermediate gradation value of "20".

FIG. 13 is a diagram showing the result of screen processing performed on an intermediate gradation value of "64".

FIG. 14 is a diagram showing the result of screen processing performed on an intermediate gradation value of "64".

FIG. 15 is a diagram showing the result of screen processing performed on an intermediate gradation value of "150".

FIG. 16 is a diagram showing the result of screen processing performed on an intermediate gradation value of "150".

FIG. 17 is a diagram showing the result of screen processing performed on a gradation value of "255".

FIG. 18 is a diagram showing the result of screen processing performed on a gradation value of "255".

FIG. 20 is a diagram showing the result of screen processing using the first screen angle.

FIG. 23 is a diagram showing the result of screen processing performed on an intermediate gradation value of "64".

FIG. 24 is a diagram showing the result of screen processing performed on an intermediate gradation value of "64".

FIG. 30 is a diagram illustrating the result of the composition processing.

FIG. 32 is a diagram showing an input pixel group having an intermediate gradation value of "4" and forming a uniform region.

FIG. 33 is a diagram showing the result of screen processing performed on a gradation value of "4".

FIG. 35 is a diagram showing the result of screen processing using the first screen angle.

FIG. 43 is a diagram showing an angle detection filter.

FIG. 44 is a diagram showing a vertical thin line having a gradation value of "30".

FIG. 45 is a diagram showing the result of screen processing in which the thin line has disappeared.

FIG. 46 is a diagram showing the result of screen processing in which the thin line has disappeared.

FIG. 47 is a diagram showing a horizontal thin line having a gradation value of "30".

FIG. 48 is a diagram showing a screen table that realizes a 45-degree screen angle.

FIG. 49 is a diagram showing the result of screen processing performed on a uniform region having an intermediate gradation value of "30".

FIG. 50 is a diagram showing the result of screen processing according to the third embodiment.

FIG. 51 is a diagram showing the result of screen processing according to the third embodiment.

DETAILED DESCRIPTION OF THE PREFERRED EMBODIMENTS

Hereinafter, embodiments of the present invention will be described with reference to the drawings.

1. First Embodiment 1-1. Configuration

Figure 1:
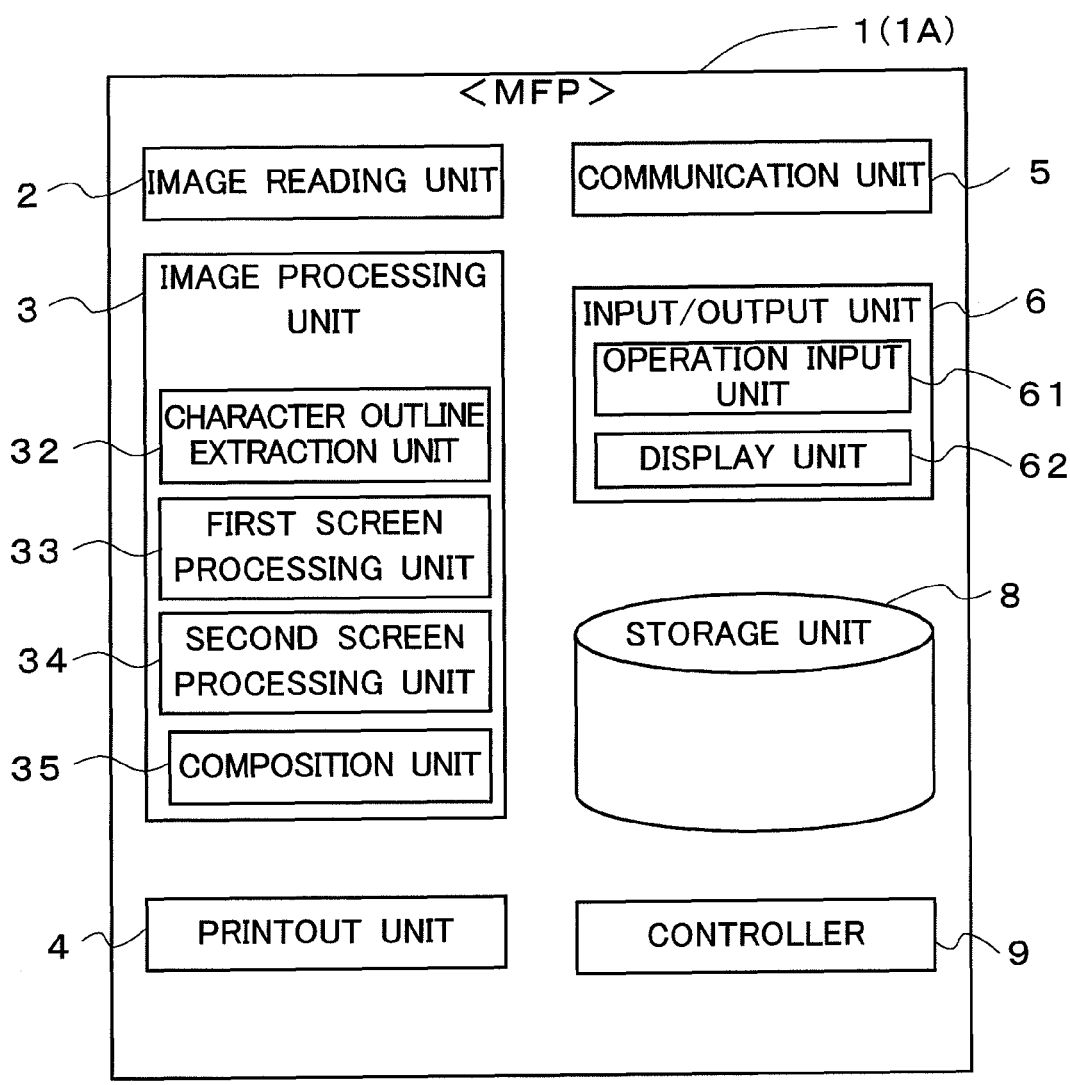
FIG. 1 is a schematic diagram showing a configuration of an image processing apparatus according to a first embodiment.

FIG. 1 is a schematic diagram showing a configuration of an image processing apparatus 1 (1A) according to a first embodiment. Here, the image processing apparatus 1 (1A) is constituted as a Multi-Functional Peripheral (abbreviated as "MFP").

The MFP 1 is an apparatus (also referred to as a Multi-Functional Peripheral) that has a scanner function, a printer function, a copy function, a facsimile function and the like. Specifically, the MFP 1 includes an image reading unit 2, an image processing unit 3, a printout unit 4, a communication unit 5, an input/output unit 6, a storage unit 8, and a controller 9, and realizes the functionality of the aforementioned units by operating these units integrally. Note that the MFP 1 is also referred to as an "image forming apparatus" or the like.

The image reading unit 2 is a processing unit that optically reads an original document placed at a predetermined position on the MFP 1 and generates an image of the original document (also referred to as a "document image"). The image reading unit 2 is also referred to as a "scanner unit".

The image processing unit 3 is a processing unit that performs various types of image processing on the scanned image generated by the image reading unit 2. The image processing unit 3 includes a character outline extraction unit 32, a first screen processing unit 33, a second screen processing unit 34, and a composition unit 35.

The character outline extraction unit 32 extracts an outline region of a character as well as detecting a line region of the character, and sections the line region of the character into the outline region and an inner region enclosed by the outline region.

The first screen processing unit 33 is a processing unit that performs screen processing (also referred to as "dithering") using a first screen angle θa. The second screen processing unit 34 is a processing unit that performs screen processing using a second screen angle θb. The second screen angle θb is an angle different from the first screen angle θa. For example, the second screen angle θb is an angle orthogonal to the first screen angle θa.

The composition unit 35 is a processing unit that composites the result of screen processing performed with the first screen angle θa and the result of screen processing performed with the second screen angle θb.

As described later, the composition unit 35 generates an output image for the outline region of a character by averaging the result of screen processing performed with the first screen angle θa and the result of screen processing performed with the second screen angle θb and compositing the averaged results. On the other hand, the composition unit 35 generates an output image for the inner region of a character by using only the result of screen processing performed with the first screen angle θa.

In the present embodiment, the image processing unit 3 generates an output image by performing AM screen processing on an input image having intermediate gradation values, under the control of the controller 9.

The printout unit 4 is an output unit that prints out a target image on various types of media such as paper, based on image data (output image) of that image.

The communication unit 5 is a processing unit capable of facsimile communication via a public network or the like. The communication unit 5 is also capable of network communication via a communication network NW. Using such network communication enables the MFP 1 to exchange various types of data with the desired party. The MFP 1 is also capable of transmitting/receiving e-mails, using such network communication.

The input/output unit 6 includes an operation input unit 61 that receives input to the MFP 1, and a display unit 62 that displays and outputs various types of information.

The storage unit 8 is constituted as a storage device such as a hard disk drive (HDD). A document image or the like generated by the image reading unit 2 or the like is stored in the storage unit 8.

The controller 9 is a control device that performs overall control of the MFP 1, and is constituted by a CPU and various types of semiconductor memories (such as a RAM and a ROM). The various types of functionality of the MFP 1 are realized by the various processing units operating under the control of the controller 9.

1-2. Overview of Image Processing

Next is a description of an overview of screen processing performed on characters.

Figure 2:
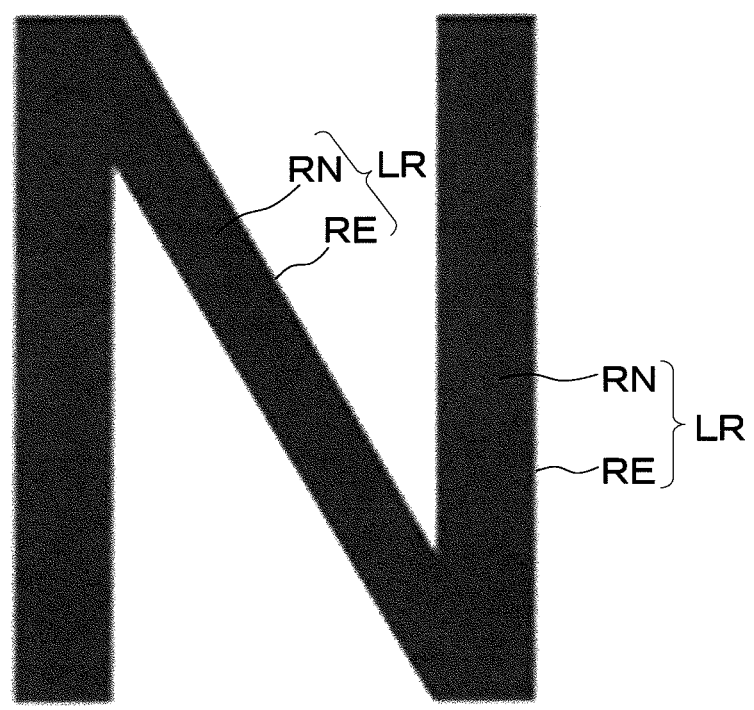
FIG. 2 is a diagram showing a character in an input image.

FIG. 2 is a diagram showing a character (here, "N") in an input image. FIG. 2 shows one (e.g., K-plane image) of four plane images (Y-, M-, C-, and K-plane images) generated by YMCK conversion of RGB values in a color image. Assume here that each plane image is an image having an intermediate gradation value (e.g., "64" among all gradation values from "0" to "255" represented with a 256-level gradation).

In this image forming apparatus, gradation representation is realized by performing screen processing on each plane image on each page including such a character. In order to suppress interference of the plane images, different screen angles θa are employed for different plane images.

Figure 3:
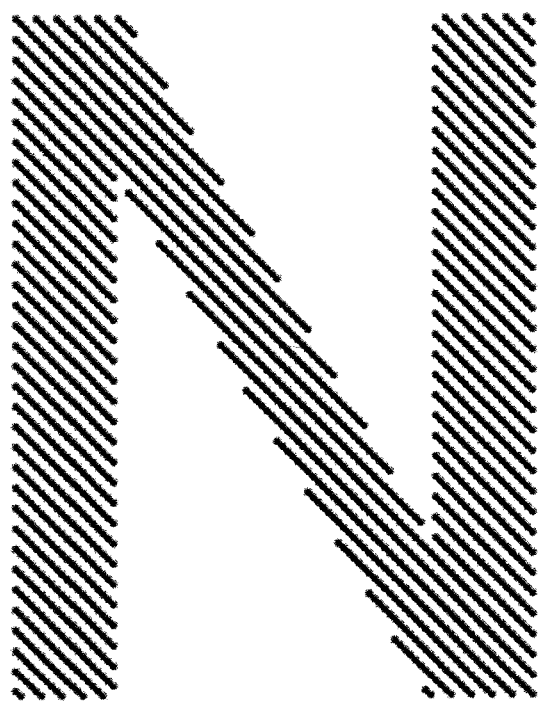
FIG. 3 is a diagram showing the result of screen processing according to a comparative example.

Incidentally, as mentioned above, there is the problem that jaggies are noticeable if a difference between the outline angle of a character and the screen angle θa is relatively small in a certain plan image. Specifically, referring to an oblique portion of the character "N" that is sandwiched by the vertical lines on both sides (a linear region extending from the top left to the bottom right) as shown in FIG. 3, a difference between the outline angle (−60 degrees) of that portion and the screen angle θa (i.e., −45 degrees) is relatively small at approximately 15 degrees (see FIG. 5). Therefore, "jaggies" appear in the vicinity of edges of the oblique portion.

Hereafter, such a problem will be first discussed in more detail. Note that although the case where the screen angle θa is −45 degrees is shown in FIG. 3, the following description mainly discusses the case where the screen angle θa is 0 degrees, in order to simplify the description. Note also that "multi-valued screen processing", rather than "binary screen processing", is described as an example of the screen processing.

Figure 8:
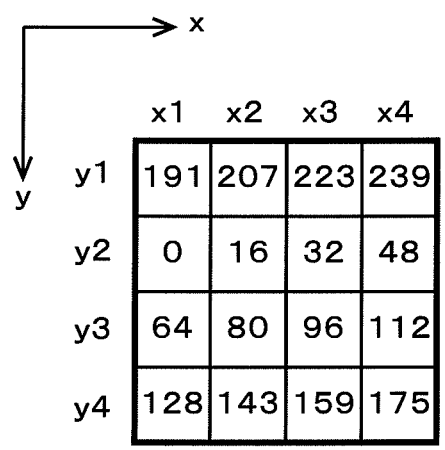
FIG. 8 is a diagram showing a screen table corresponding to a first screen angle.

FIG. 8 is a diagram showing a screen matrix reference table (hereinafter, also referred to simply as a "screen table") TB1 used for the multi-valued screen processing. In FIG. 8, a 4×4 matrix is shown. The element value at each position in the matrix represents a reference value (critical value) for the input gradation value at that position. Here, a pixel (output pixel) at each position where the input gradation value exceeds the reference value is set to an "ON" state. Note that, in the present example employing the multi-valued screen processing, the "ON" state of each pixel is further distinguished into multi-level (here, 16-level) states corresponding to each value. Multi-level values are represented distinguishably from each other by, for example, drawing pixels of different sizes. In binary screen processing, each output pixel is in either a single-level "ON" state or a single-level "OFF" state as discussed later.

By way of example, a gradation value Din of each pixel in an input pixel group having an intermediate gradation value of "20" and forming a uniform region (see FIG. 11) is converted into a gradation value Dout of each pixel in an output pixel group as shown in FIG. 12, through conversion processing using the screen table TB1. Note that the case where the screen ruling used for the output image corresponds to one fourth the resolution (spatial resolution) of the input image is illustrated herein.

Specifically, firstly, the gradation value Din at each position in the input pixel group is compared with the reference value (critical value) Dref at the corresponding position in the screen table TB1. Then, if the input gradation value Din at a certain position is less than or equal to the corresponding reference value Dref, the output gradation value Dout at that position is set to "OFF" (zero). On the other hand, if the input gradation value Din at a certain position is greater than the corresponding reference value Dref, the output gradation value Dout at that position is set to "ON". Note that, in the multi-valued screen processing as employed herein, the "ON" state of each pixel is further distinguished into multi-levels (here, 16 levels) corresponding to each value. To be more specific, the output gradation value Dout is set to a difference Ddif between the input gradation value Din and the reference value Dref. If the difference Ddif is greater than "16", the output gradation value Dout is set to the maximum value of "16".

For example, referring to a position (x1, y1), the input gradation value Din of "20" (see FIG. 11) is compared with the corresponding reference value Dref of "191" in the screen table TB1 (see FIGS. 8 and 10). Then, the input gradation value Din at the position (x1, y1) is determined to be less than or equal to the reference value Dref, and the output gradation value Dout is set to "OFF" (zero) (see FIG. 12). Similarly, the input gradation value Din of "20" at a position (x2, y1) is compared with the reference value Dref of "207" at the corresponding position in the screen table TB1 (see FIG. 10), and the output gradation value Dout at the position (x2, y1) is set to "OFF" (zero). The output gradation value Dout at a position (x3, y1) and the output gradation value Dout at a position (x4, y1) are also set to "OFF" (zero).

Furthermore, the input gradation value Din of "20" at a position (x1, y2) (see FIG. 11) is compared with the reference value Dref of "0" at the corresponding position (x1, y2) in the screen table TB1 (see FIGS. 8 and 10). Then, the input gradation value Din at the position (x1, y2) is determined to be greater than the reference value Dref, and the output gradation value Dout is set to "ON" (see FIGS. 10 and 12). To be more specific, the output gradation value Dout at the position (x1, y2) is set to the maximum value of "16" (see FIG. 12).

The input gradation value Din of "20" at a position (x2, y2) (see FIG. 11) is compared with the reference value Dref of "16" at the corresponding position (x2, y2) in the screen table TB1 (see FIGS. 8 and 10). Then, the input gradation value Din at the position (x2, y2) is determined to be greater than the reference value Dref, and the output gradation value Dout is set to "ON" (see FIGS. 10 and 12). To be more specific, the output gradation value Dout at the position (x2, y2) is set to a difference Ddif of "4" between the input gradation value Din and the reference value Dref (see FIG. 12).

The output gradation values Dout at the other positions are also determined in a similar manner. Accordingly, the output gradation values Dout as shown in FIG. 12 are obtained. In FIG. 12, the positions where the output gradation value Dout is "OFF" is shown in white, the positions where the output gradation value Dout is the maximum value of "16" is shown in dark color (black), and the positions where the output gradation value Dout is "4" are shown in light color (gray). The same applies for FIG. 10. Note that the numerical value at each position in FIG. 10 represents each reference value Dref in the screen table TB1, whereas the numerical value at each position in FIG. 12 represents each output gradation value Dout.

Similarly, the gradation value Din of each pixel in an input pixel group having an intermediate gradation value of "64" and forming a uniform region (not shown) is converted into the gradation value Dout of each pixel in an output pixel group as shown in FIG. 14, through conversion processing using the screen table TB1 (see FIG. 8). To be specific, the input gradation values Din of "64" at positions (x1, y2), (x2, y2), (x3, y2), and (x4, y2) are each converted into an output gradation value Dout of "16" by screen processing (see FIGS. 13 and 14). On the other hand, the output gradation values Dout at the other positions are set to "OFF" (zero). Note that the numerical value at each position in FIG. 14 represents each output gradation value Dout, and the numerical value at each position in FIG. 13 represents each reference value Dref in the screen table TB1 (not the output gradation value Dout). In FIGS. 13 and 14, the output values at the respective position are shown with contrasting densities as in FIGS. 10 and 12.

As shown in FIG. 14, in the case where the screen angle θa is 0 degrees, a uniform region having an intermediate gradation value of "64" is represented by a collection of minute pixels (dots) that extends in a direction of the screen angle θa (horizontal direction).

FIGS. 15 and 16 are diagrams showing the result of conversion processing performed on an input pixel group having an intermediate gradation value of "150" and forming a uniform region. Similarly, FIGS. 17 and 18 are diagrams showing the result of conversion processing performed on an input pixel group having the maximum gradation value of "255" and forming a uniform region. Also, FIG. 9 is a diagram showing the result of conversion processing performed on an input pixel group having a gradation value of "0" and forming a uniform region. The numerical value at each position in FIGS. 15, 17, and 9 represents each reference value Dref in the screen table TB1, and the numeral value at each positions in FIGS. 16 and 18 represents each output gradation value Dout. In FIGS. 9 and 15 to 18, the output values at the respective positions are shown with contrasting densities.

Figure 19:
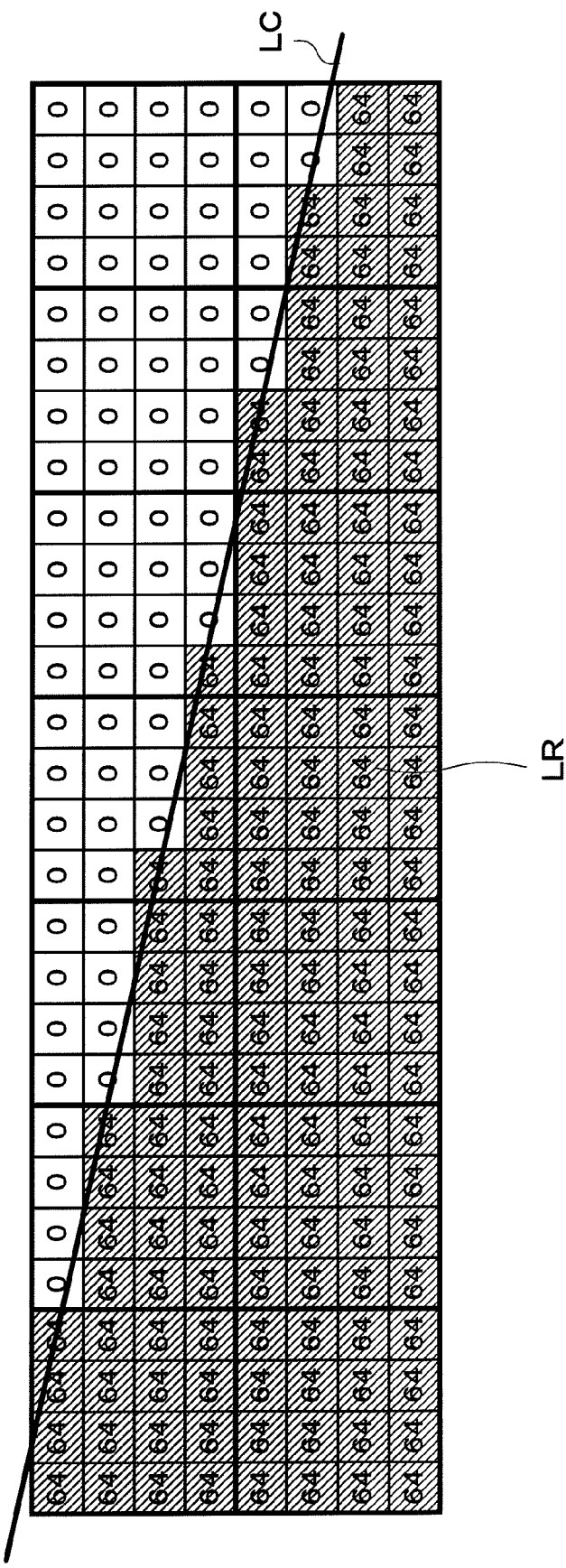
FIG. 19 is a diagram showing an enlarged view of the vicinity of a line region of a character.

FIG. 19 is a diagram showing an enlarged view of the vicinity of a line region LR (see also FIG. 2) of a character. The diagram in FIG. 19 is equivalent to a state in which the oblique line portion (to be more specific, the vicinity of an upper right outline of the line portion) of the character "N" in FIG. 2 is rotated by 45 degrees and displayed on an enlarged scale. In FIG. 19, the line region LR (hatched region in the figure) of the character is below a straight line LC.

Figure 20:
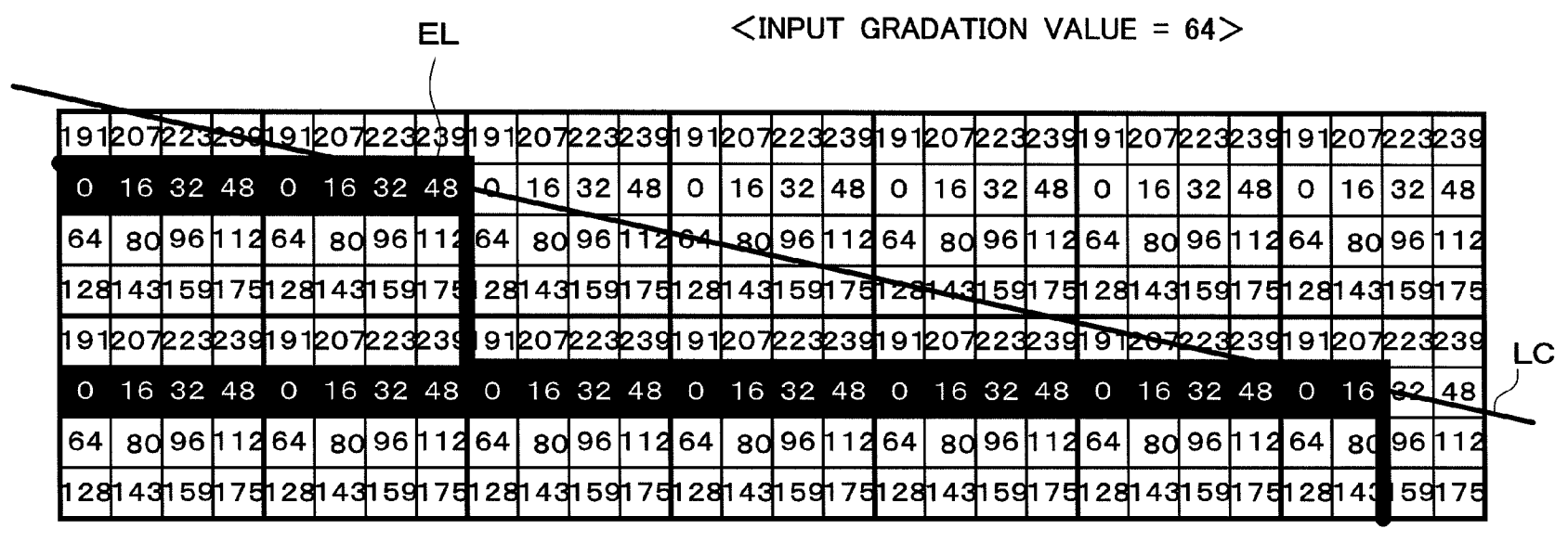
Figure 21:
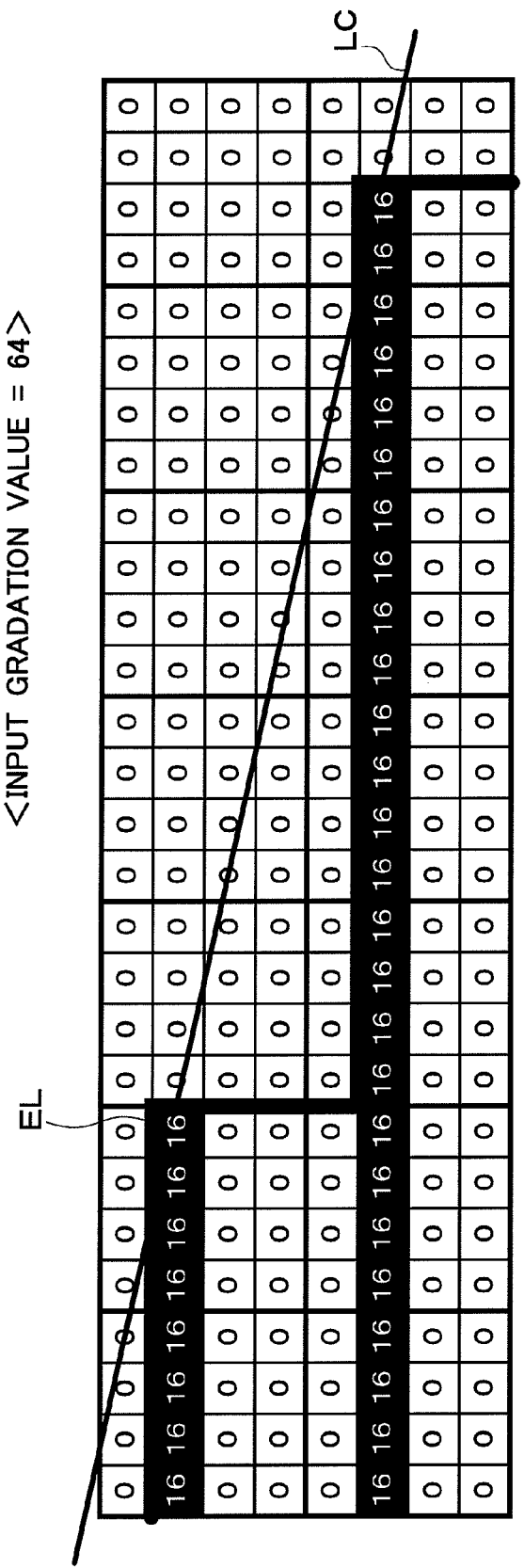
FIG. 21 is a diagram showing the result of screen processing using the first screen angle.

FIGS. 20 and 21 are diagrams showing the result of screen processing performed on the uniform region (the line region LR having an intermediate gradation value of "64") shown in FIG. 19. The numerical value at each position in FIG. 20 represents each reference value Dref in the screen table TB1, and the numerical value at each position in FIG. 21 represents each output gradation value Dout. Also, in FIGS. 20 and 21, the output values at the respective positions are shown with contrasting densities.

As shown in FIGS. 20 and 21, if the angle of the outline region (also referred to as an "outline angle") of a character is relatively close to the screen angle θa, "jagged edges" (jaggiees) as mentioned above appear in the outline region of the character. The extra thick line EL in FIGS. 20 and 21 schematically show such "jagged edges". In this way, "jagged edges" can appear with the technique in which screen processing is performed using only a single screen table TB1 (hereinafter, also referred to as a "technique according to a comparative example").

In view of this, processing as described below is further performed in the present embodiment. This processing enables jaggies to be reduced.

Specifically, processing for sectioning the "line region" LR of a character in the input image (see FIG. 25) into an outline region RE and an inner region RN is firstly performed. More specifically, an edge region having a width of approximately the outermost one or several pixels in the line region LR of the character is specified as the outline region RE (see FIG. 25). Meanwhile, an inner region enclosed in that outline region RE is specified as the inner region RN (see also FIG. 2).

Furthermore, another screen processing SR2 using another screen angle θb is also performed, in addition to screen processing SR1 based on the above screen angle θa. This screen processing SR2 is performed on only the outline region RE. For pixels in the outline region RE, the processing result of the screen processing SR1 based on the screen angle θa and the processing result of the screen processing SR2 based on the screen angle θb are both used.

Figure 22:
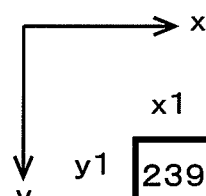
FIG. 22 is a diagram showing a screen table corresponding to a second screen angle.

FIG. 22 is a diagram showing a screen table TB2 used for the screen processing using the screen angle θb. The screen table TB2 corresponds to a table obtained by rotating the screen table TB1 by 90 degrees. Using this screen table TB2 realizes the screen processing performed based on the screen angle θb (the angle orthogonal to the screen angle θa).

FIGS. 23 and 24 are diagrams corresponding respectively to FIGS. 13 and 14. As shown in FIGS. 23 and 24, according to the screen processing SR2, "ON"-state output pixels are successively arranged in the vertical direction. As mentioned above, in the present embodiment, the screen processing SR2 using the screen angle θb is performed on the outline region RE (see FIG. 25).

Figure 25:
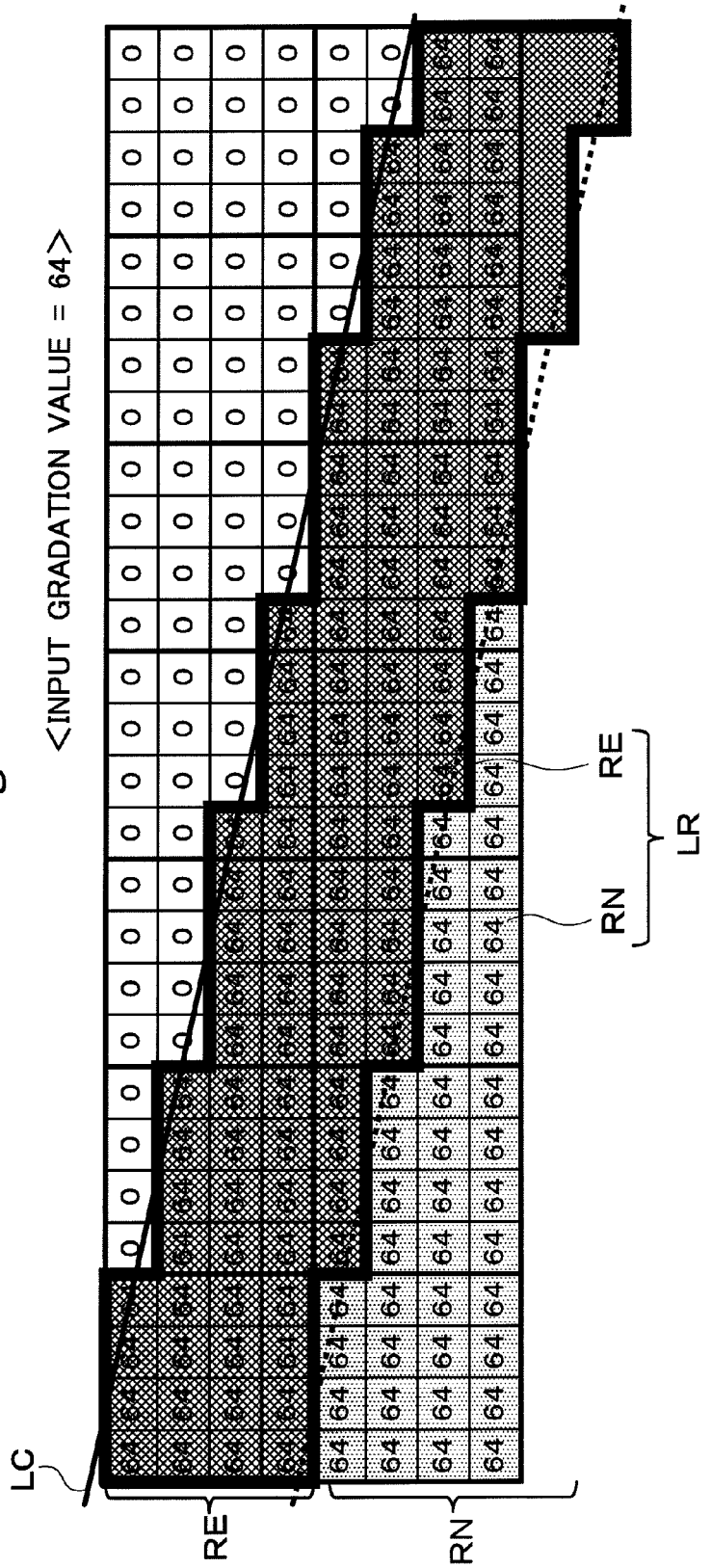
FIG. 25 is a diagram showing an outline region.
Figure 26:
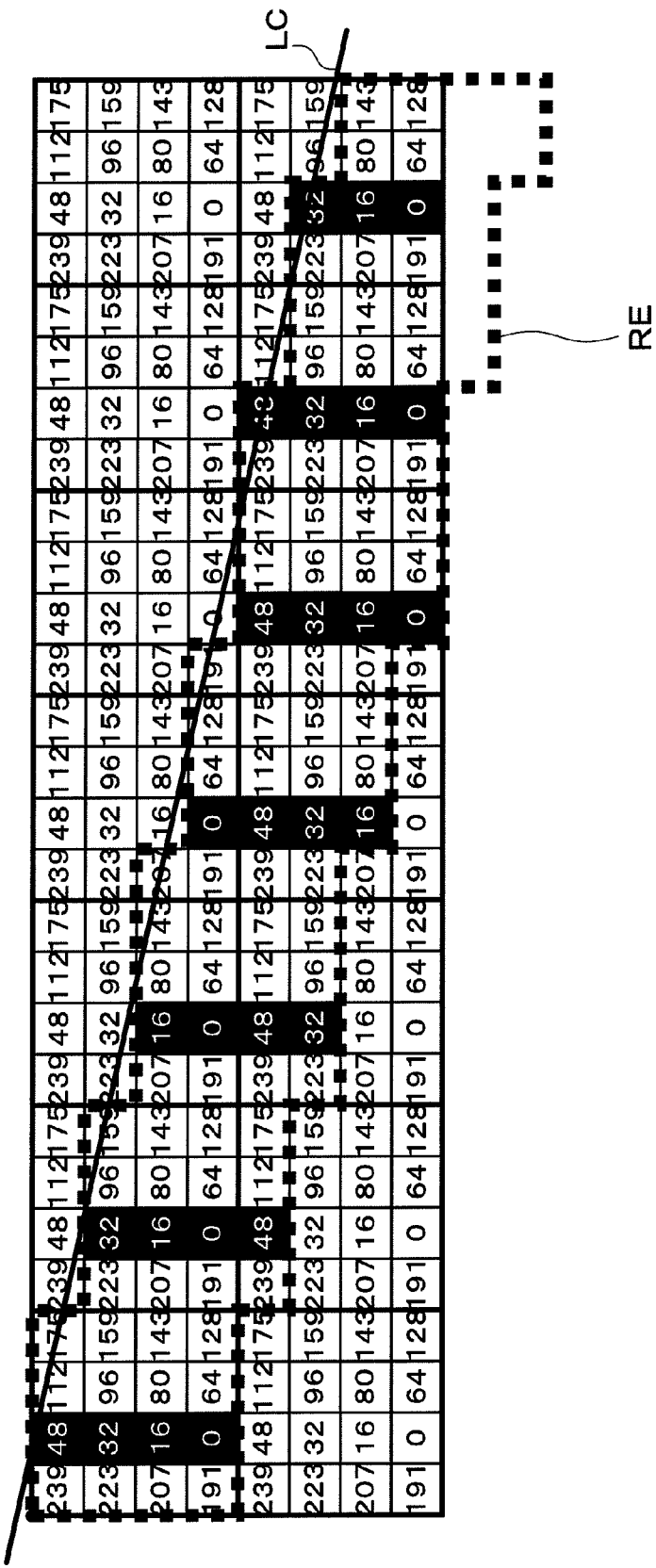
FIG. 26 is a diagram showing the result of screen processing using the second screen angle.
Figure 27:
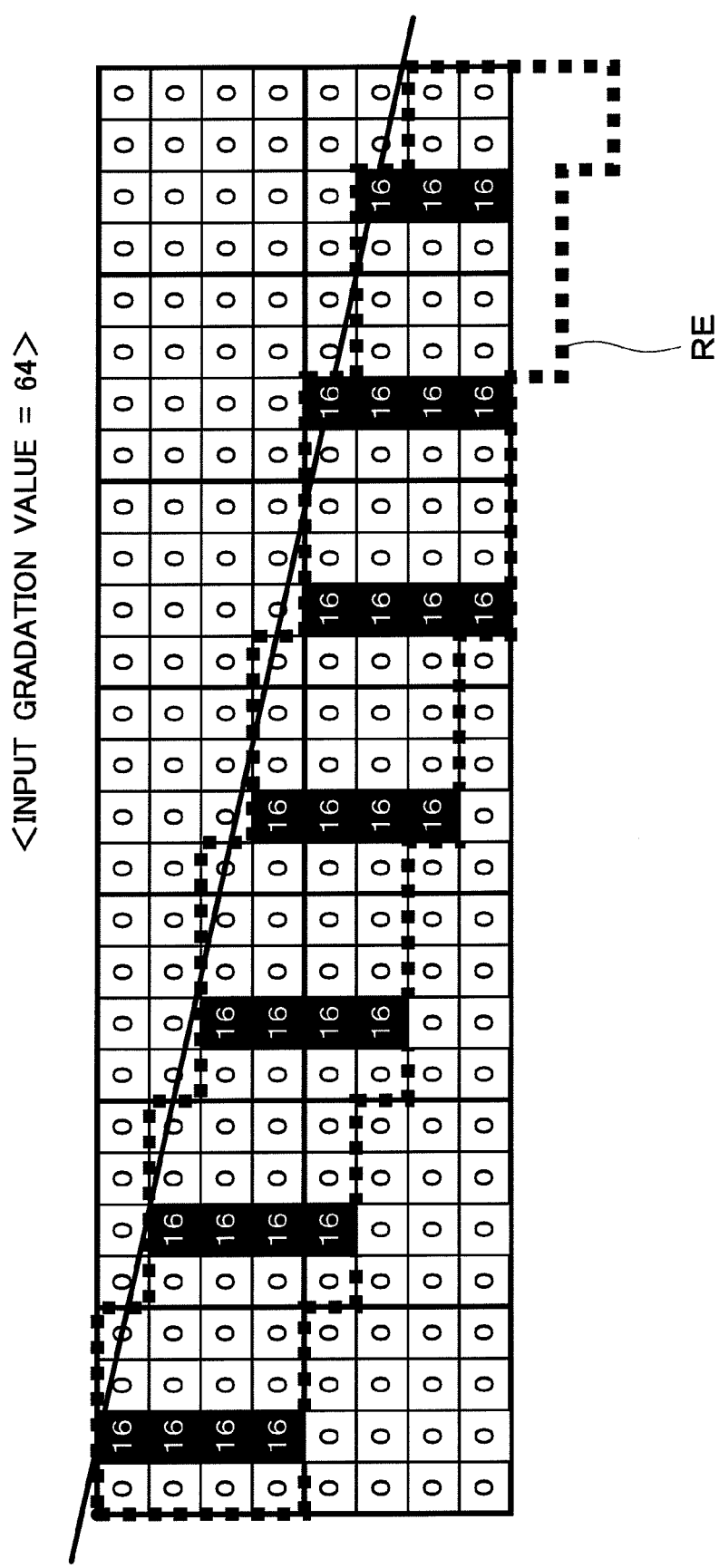
FIG. 27 is a diagram showing the result of screen processing using the second screen angle.

FIGS. 26 and 27 are diagrams showing the result of the screen processing SR2 performed on the outline region RE in FIG. 25 and corresponding respectively to FIGS. 23 and 24. As shown in FIGS. 26 and 27, "ON"-state output pixels are successively arranged in the vertical direction.

Figure 28:
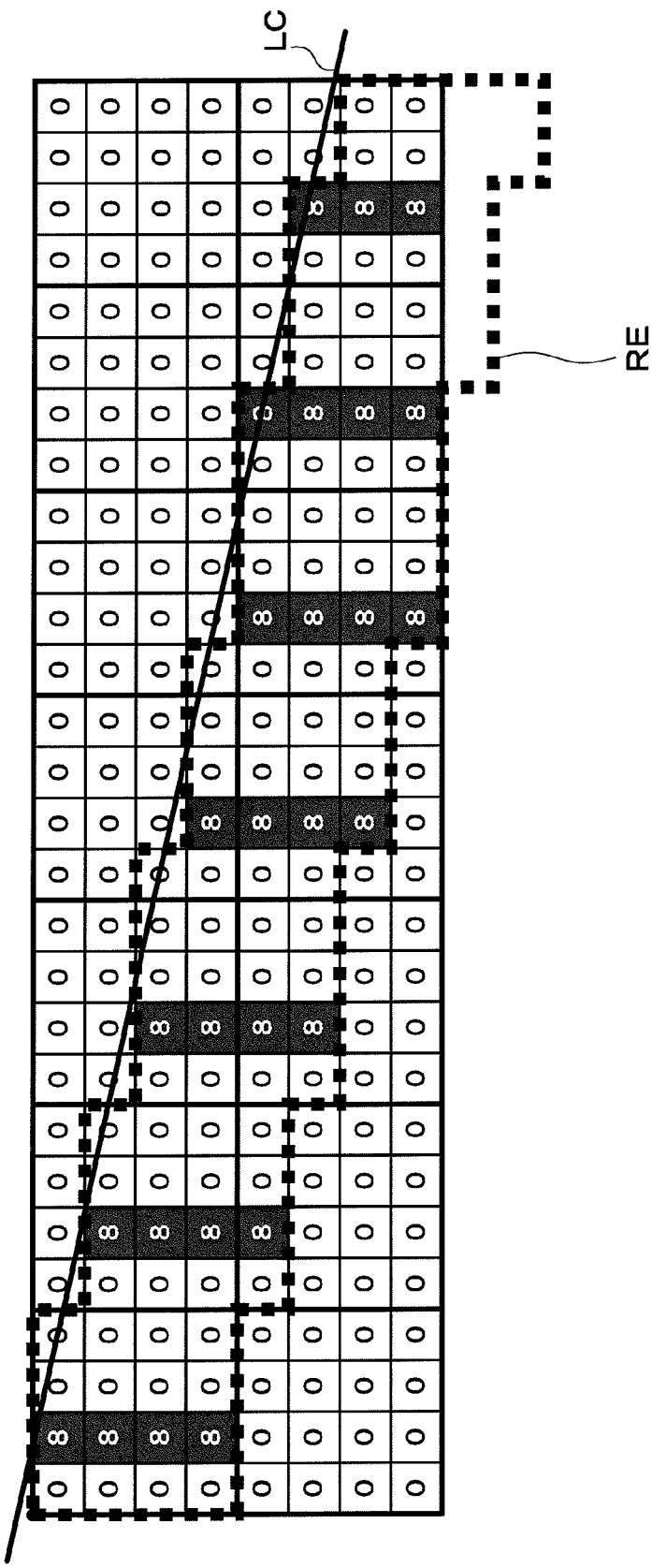
FIG. 28 is a diagram illustrating composition processing.
Figure 29:
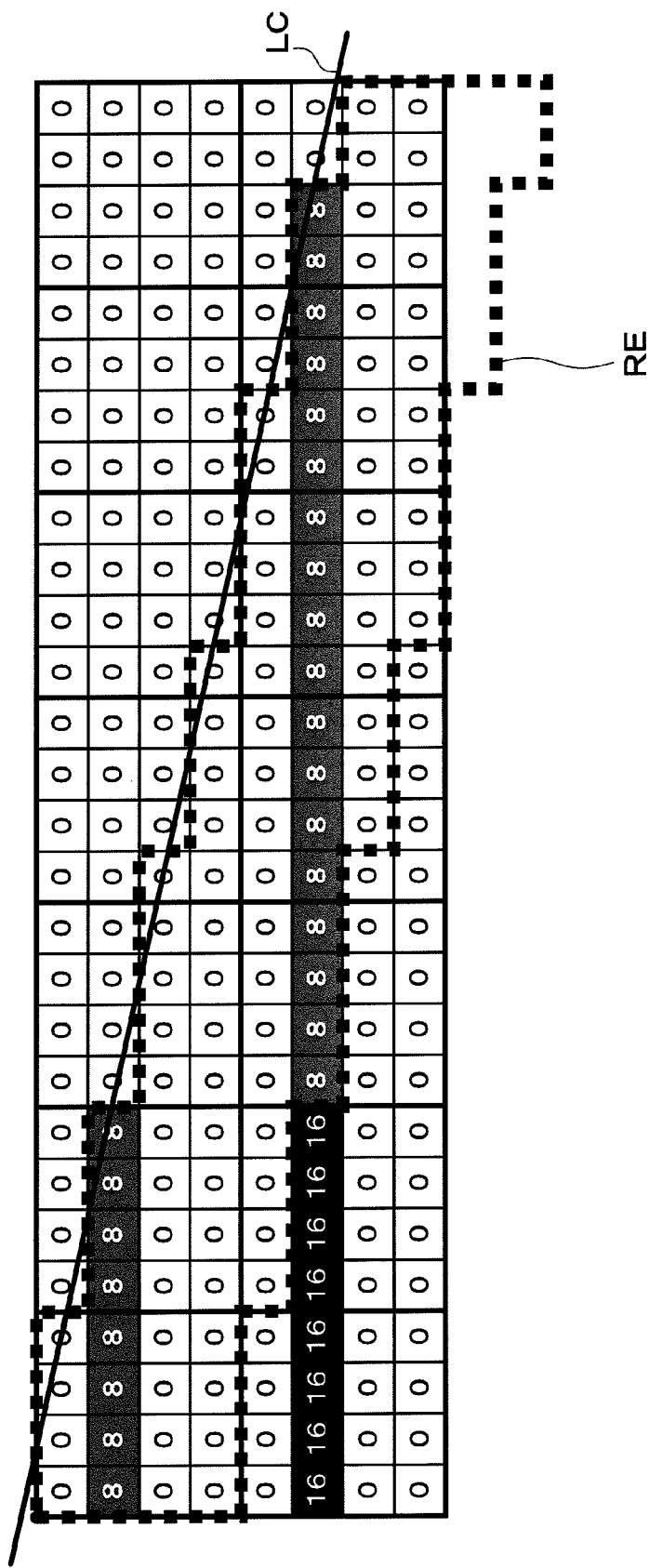
FIG. 29 is a diagram illustrating composition processing.
Figure 30:
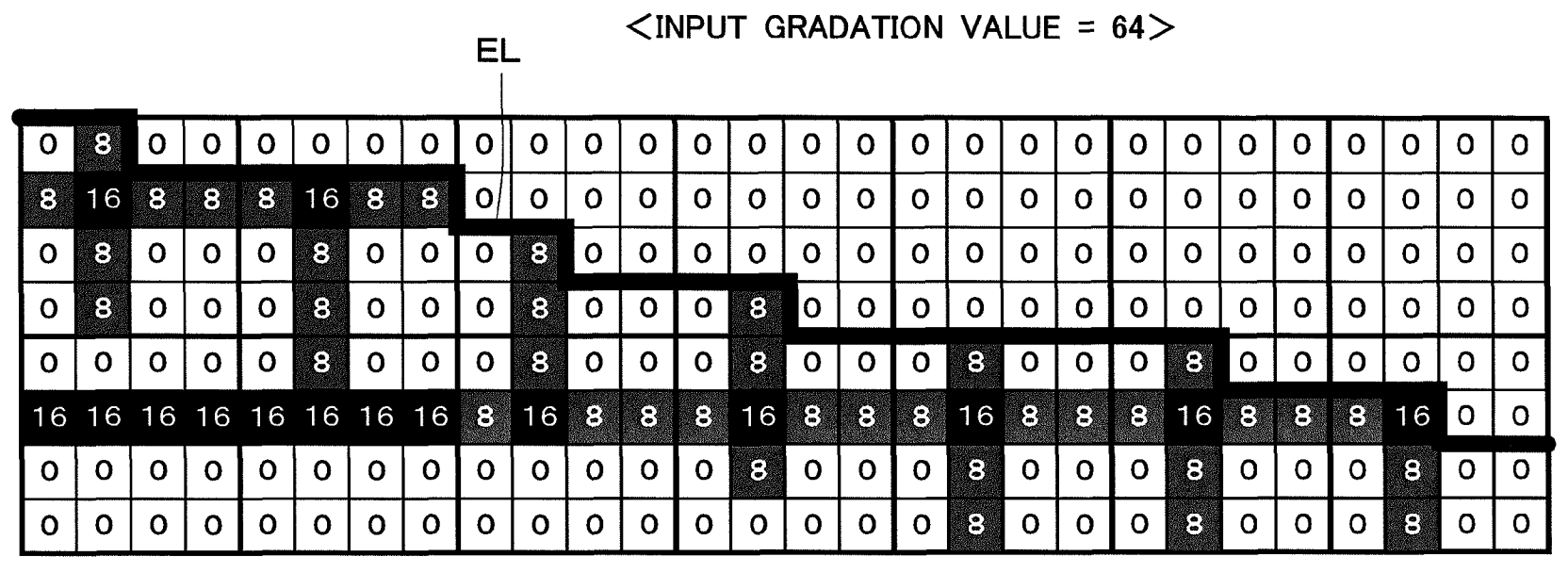

Furthermore, for the outline region RE, the processing result of the screen processing SR2 and the processing result of the above-described screen processing SR1 are composited together. Both of the processing results are averaged before composition. FIGS. 28 to 30 are diagrams illustrating such composition processing. FIG. 28 is a diagram showing a state in which the processing result of the screen processing SR2 is halved in value, and FIG. 29 is a diagram showing a state in which the processing result of the screen processing SR1 for the outline region RE is halved in value. Also, FIG. 30 is a diagram showing the composition result.

Specifically, each output gradation value Dout calculated by the screen processing SR2 is changed to a half value as shown in FIG. 28. For example, the output gradation value Dout (see FIG. 27) that has the maximum value of "16" before change is changed to a value of "8".

Each output gradation value Dout (see FIG. 21) calculated for the outline region RE by the screen processing SR1 is also changed to a half value (see FIG. 29). To be more specific, as can be seen from a comparison of FIGS. 21 and 29, the output gradation values Dout of the leftmost eight pixels in the second row from the top are each changed to "8". Also, the output gradation values Dout of 18 pixels in the sixth row from the top and the 9th to 26th columns from the left and are each changed to "8". Note that each output gradation value Dout calculated by the above screen processing SR1 for the region (inner region) other than the outline region RE are maintained as is. In FIG. 29, the output gradation values Dout of the leftmost eight pixels in the sixth row from the top are each maintained at "16".

Then, as for the outline region RE, composition is performed by adding (averaging) each output gradation value Dout calculated by the screen processing SR1 and each output gradation value Dout calculated by the screen processing SR2. FIG. 30 is a diagram showing the output gradation values Dout obtained as a result of the addition processing (composition processing).

As shown in FIG. 30, referring to, for example, the uppermost left 4×4 matrix, the processing result of the screen processing SR1 is reflected such that four "ON"-state pixels having a gradation value of "8" are successively arranged in the horizontal direction in the second row from the top. Also, the processing result of the screen processing SR2 is reflected such that four "ON"-state pixels having a gradation value of "8" are successively arranged in the vertical direction in the second column from the left. Note that the "ON"-state pixel in the second row from the top and the second column from the left has a gradation value of "16" that is a value obtained by adding the processing result of "8" of the screen processing SR1 and the processing result of "8" of the screen processing SR2.

In this way, for the outline region RE, composition is performed by averaging the processing result of the screen processing SR1 and the processing result of the screen processing SR2. As a result, apparently similar gradation values to those obtained from only the processing result of the screen processing SR1 are realized in a 4×4 matrix that has undergone both the screen processing SR1 and the screen processing SR2. This avoids a substantially excessive increase in gradation value.

Furthermore, a similar operation is performed at each position in the outline region RE. As a result, an "apparent outline" as indicated by the extra thick line EL in FIG. 30 appears. Compared to FIG. 21, it can be seen that "jagged edges" (jaggiees) are suppressed.

On the other hand, as for pixels in the inner region RN, only the processing result of the screen processing SR1 is used, out of the processing results of both the screen processing SR1 and the screen processing SR2. Accordingly, similar screen processing to that in FIGS. 20 and 21 is performed on the pixels in the inner region RN.

Now, refer again to the example in FIG. 3. A similar operation is also performed in the case where the screen angle θa is 45 degrees. In this case, however, a screen table TB created for the 45-degree screen angle θa is used.

Figure 4:
FIG. 4 is a diagram showing the result of screen processing according to the first embodiment.

As a result, the processing result as shown in FIG. 4 is obtained.

Figure 5:
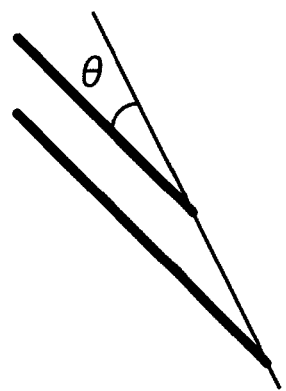
FIG. 5 is a diagram showing the result of screen processing according to a comparative example.
Figure 6:
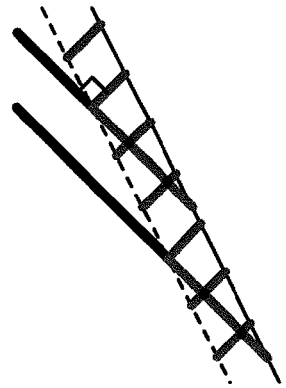
FIG. 6 is a diagram showing the result of screen processing according to the first embodiment.

FIG. 5 is a diagram schematically showing the result of screen processing according to a comparative example, and FIG. 6 is a diagram schematically showing the result of screen processing according to the above-described embodiment. FIG. 5 corresponds to FIG. 21, and FIG. 6 corresponds to FIG. 30.

As can be seen from a comparison of FIGS. 5 and 6, jaggies in the outline region RE of the character are suppressed by compositing the results of screen processing performed on the outline region RE using two types of screen angles. To be more specific, as a result of reflecting the result of screen processing using a second screen angle θb (e.g., +45 degrees) different from a predetermined screen angle θa (e.g., −45 degrees), the interval of drawing "ON"-state pixels in the direction of the outline that is close to the direction of the screen angle (the direction parallel to the screen angle θa) is narrowed. This reduces jaggies in the outline region RE.

Note that in the present embodiment, for the inner region RN of the character, only the processing result of the screen processing SR1 using the screen angle θa is reflected as also shown in FIG. 4. However, the present invention is not limited thereto, and the above-described processing for compositing the results of both the screen processing SR1 and the screen processing SR2 based on the two screen angles θa and θb may also be performed on the inner region RN of the character. However, in the case where the above-described processing is performed for each plane image, there is the possibility that the plane images may interfere with each other if the above-described processing for compositing the results of both the screen processing SR1 and the screen processing SR2 based on the two screen angles θa and θb is performed even on the inner region RN of the character. For this reason, it is preferable that only the processing result of the screen processing SR1 using the screen angle θa be reflected on the inner region RN of the character, as described above. In other words, it is preferable that the above-described processing for compositing the results of both the screen processing SR1 and the screen processing SR2 using the two screen angles θa and θb be performed on only the outline region RE out of the line region LR of the character.

1-3. Exemplary Processing

Figure 7:
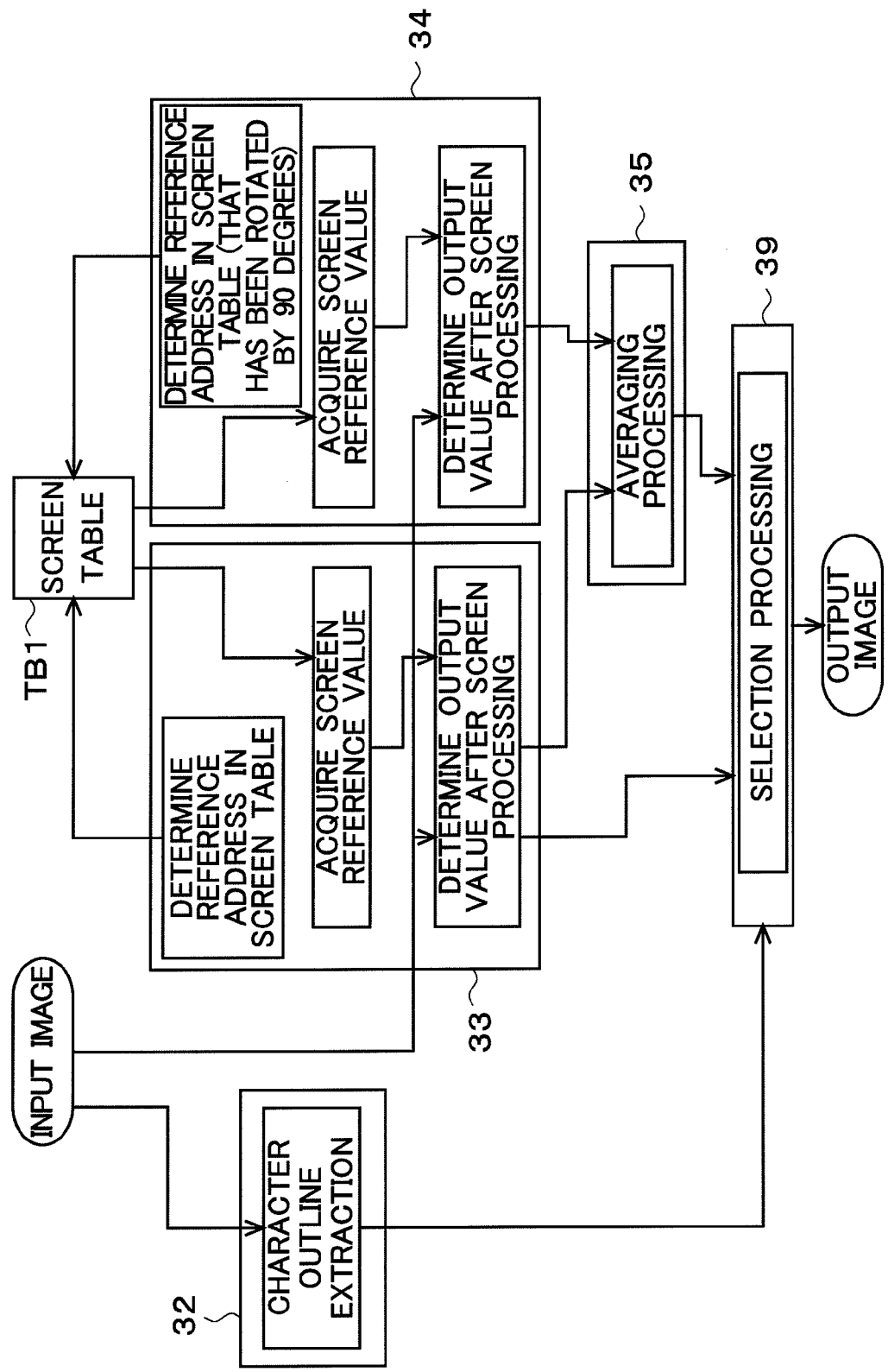
FIG. 7 is a schematic diagram showing a configuration of an image processing unit.

Next, screen processing performed by hardware of the image processing unit 3 will be described in detail with reference to FIG. 7.

The character outline extraction unit 32 firstly performs processing for sectioning the "line region" LR of a character in an input image (here, a character image) into the outline region RE and the inner region RN. Specifically, an edge region having a width of approximately the outermost one or several pixels in the line region LR of the character is specified as the outline region RE (see FIG. 25). Meanwhile, an inner region enclosed in that outline region RE is specified as the inner region RN. Accordingly, attribute information (to be specific, either the "outline region" or the "inner region") of a pixel at each position in the input image is determined.

Next, both the screen processing SR1 and the screen processing SR2 using the two screen angles θa and θb are performed in parallel. Specifically, the screen processing SR1 based on the screen angle θa and the screen processing SR2 based on the screen angle θb are performed in parallel.

To be specific, the screen processing SR1 based on the screen angle θa is performed by the first screen processing unit 33, based on the results of comparison processing between the input gradation value Din at each position in the input image and the reference value Dref at the corresponding position in the screen table TB1. Note that the reference value Dref at each corresponding position is acquired by invoking it from the screen table TB1, based on address information on each position. For example, the input gradation values Din at respective positions (x1, y1), (x2, y1), (x3, y1), (x4, y1), (x2, y1) and so on in the input image are sequentially compared with the reference values Dref at the respective corresponding positions (x1, y1), (x2, y1), (x3, y1), (x4, y1), (x2, y1) and so on in the screen table TB1. Then, the output gradation values at the respective positions are determined based on the comparison results.

Similarly, the screen processing SR2 based on the screen angle θb is performed by the second screen processing unit 34, based on the results of comparison processing between the input gradation value Din at each position in the input image and the reference value Dref at the corresponding position in the screen table TB2. Note here that in the screen processing SR2 of the present example, the reference value Dref at each corresponding position is acquired by invoking it from the screen table TB1, based on address information corresponding to a position after the original screen table TB1 is rotated by 90 degrees. For example, the input gradation values Din at respective positions (x1, y1), (x2, y1), (x3, y1), (x4, y1), (x2, y1) and so on in the input image are sequentially compared respectively with the reference values Dref at positions (x4, y1), (x4, y2), (x4, y3), (x4, y4), (x3, y1) and so on in the screen table TB1. Then, the output gradation values at the respective positions are determined based on the comparison results. Such an operation is equivalent to an operation using the reference values Dref at the corresponding positions in the screen table TB2.

Then, either or both of the processing results of the screen processing SR1 and the screen processing SR2 are used depending on whether each position is in the inner region RN or the outline region RE. In other words, one of two types of operations is performed depending on the attribute information of a pixel at each position in the input image.

As for positions in the inner region RN, only the processing result of the screen processing SR1 is used, out of the processing results of both the screen processing SR1 and the screen processing SR2. To be specific, a selector 39 outputs the processing result obtained by the first screen processing unit 33 directly as pixel values in the output image. Accordingly, similar screen processing to that in FIG. 3 is performed on the pixels in the inner region RN.

Meanwhile, as for positions in the outline region RE, both of the processing results of the screen processing SR1 based on the screen angle θa and the screen processing SR2 based on the screen angle θb are used.

To be more specific, the composition unit 35 performs composition by averaging the processing result of the screen processing SR1 and the processing result of the screen processing SR2 (see FIG. 30). Then, the selector 39 outputs the result of this composition processing as pixel values in the output image for the positions in the outline region RE.

The operation as described above is performed on all of the pixels in the input image, and the output image is generated as a result.

As described above, in the present embodiment, not only the first screen processing SR1 using the first screen angle θa but also the second screen processing SR2 using the second screen angle θb are performed on the outline region RE. Performing both the screen processing SR1 and the screen processing SR2 using the two screen angles θa and θb in this way enables jaggies to be suppressed as compared to the case where only single screen processing using a single screen angle is performed. In particular, since the processing for compositing both the screen processing SR1 and the screen processing SR2 using the two screen angles θa and θb is performed on respective portions of the outline region RE that have various angles, it is possible to suppress the appearance of jaggies in character outlines having various angles.

In particular, the results of both the screen processing SR1 and the screen processing SR2 using the two screen angles θa and θb are averaged for the outline region. This makes it possible to avoid a substantially excessive increase in gradation value in the case of performing both the screen processing SR1 and the screen processing SR2 using the two screen angles θa and θb.

Furthermore, since the second screen angle θb is an angle orthogonal to the first screen angle θa, it is possible to comprehensively and favorably reduce anisotropy in screen processing (dithering).

Furthermore, as for pixels in the inner region RN, the processing result of the screen processing SR1 using the first screen angle θa is utilized as is to generate an output image. That screen angle θa is determined as appropriate for each plane image. Accordingly, as for the inner region RN, it is possible to favorably avoid interference of multiple plane images (the occurrence of moire or the like).

2. Second Embodiment

A second embodiment is a variation of the first embodiment. Although the above first embodiment illustrates the case where the present invention is applied to the multi-valued screen processing, the second embodiment illustrates the case where the present invention is applied to binary screen processing. The following description focuses on differences from the first embodiment.

Figure 31:
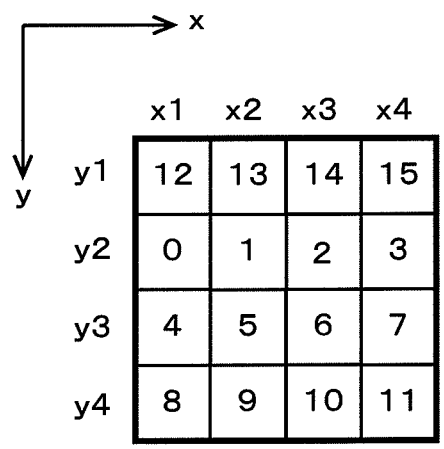
FIG. 31 is a diagram showing a screen table used for screen processing according to a second embodiment.

FIG. 31 is a diagram showing a screen matrix reference table (screen table) TB11 used for the binary screen processing. Assume here the case where input data is a 4-bit pixel value (with a 16-level gradation) and each output gradation value is also a 16-level gradation value. In FIG. 31, a 4×4 matrix is shown. The element value at each position in the matrix represents the reference value (critical value) for the input gradation value at each position. At positions where the input gradation values exceed the corresponding reference values, output pixels are set to the "ON" state, whereas at positions where the input gradation values are less than or equal to the corresponding reference values, output pixels are set to the "OFF" state. In this binary screen processing, each output pixel is in either the single-level "ON" state or the single-level "OFF" state.

For example, the gradation value Din of each pixel in an input pixel group (see FIG. 32) having an intermediate gradation value of "4" and forming a uniform region is converted into the gradation value Dout of each pixel in an output pixel group as shown in FIG. 33, through conversion processing using the screen table TB11. Here, the numerical value at each position in FIG. 33 represents each corresponding reference value Dref in the screen table TB11. In FIG. 33, the positions where the output gradation value Dout is "OFF" is shown in white, and the positions where the output gradation value Dout is "ON" are shown in dark color (black). Note that the case where the screen ruling used for the output image corresponds to one fourth the resolution (spatial resolution) of the input image is illustrated herein.

Figure 34:
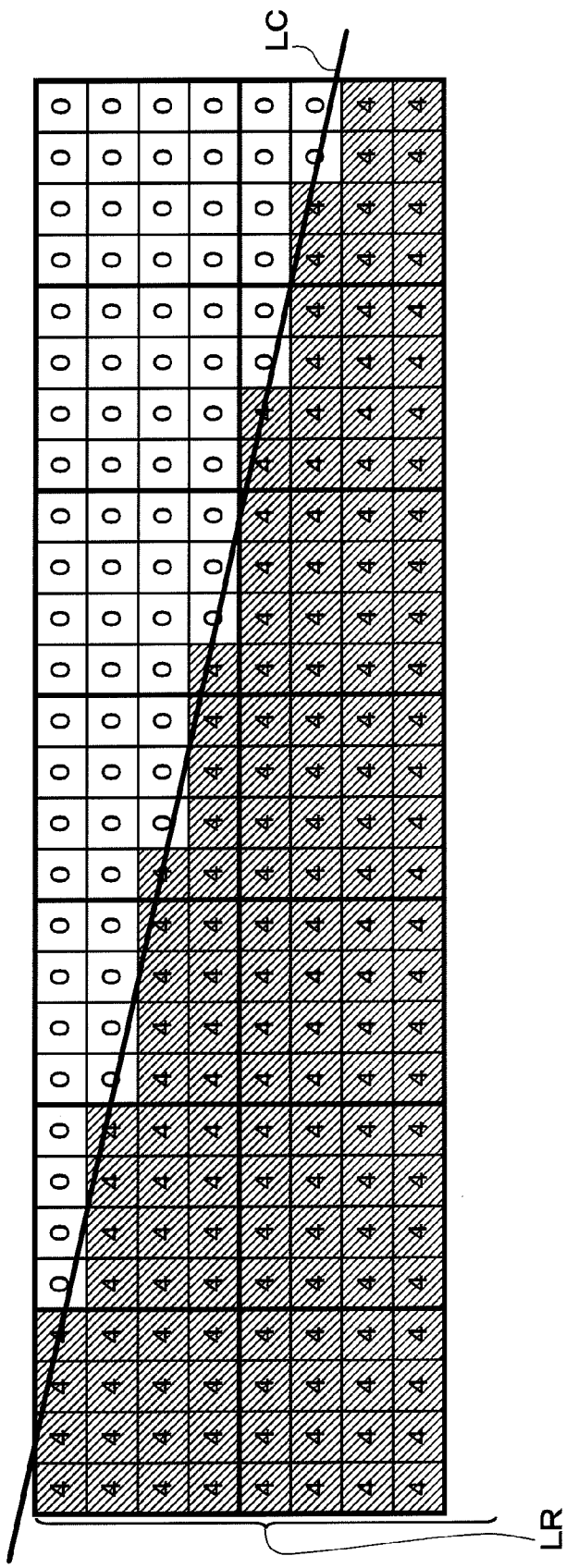
FIG. 34 is a diagram showing an enlarged view of the vicinity of a line region of a character.

FIG. 34 is a diagram showing an enlarged view of the vicinity of a line region LR of a character. The diagram in FIG. 34 is similar to that in FIG. 19, and corresponds to a state in which the oblique line portion (to be more specific, the vicinity of an upper right outline of the line portion) of the character "N" in FIG. 2 is rotated by 45 degrees and displayed on an enlarged scale.

Figure 35:
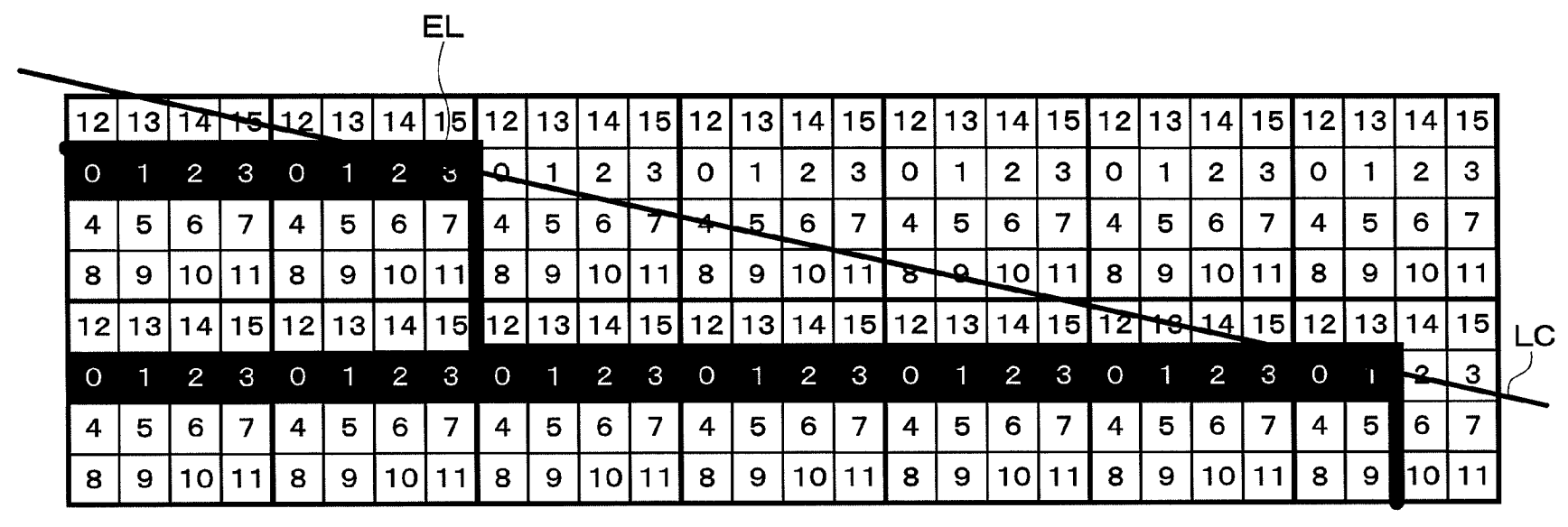

FIG. 35 is a diagram showing the result of screen processing performed on the uniform region (the line region LR having an intermediate gradation value of "4") shown in FIG. 34. In FIG. 35, "ON"-state output pixels are successively arranged in the horizontal direction. Specifically, four pixels at the positions corresponding to the four reference values ("0", "1", "2", and "3") in the screen table TB1 are set to the "ON" state.

As shown in FIG. 35, if the angle of the outline region (also referred to as an "outline angle") of a character is relatively close to the screen angle θa, "jagged edges" (jaggies) as mentioned above appear in the outline region of the character.

In view of this, processing as described below is further performed in this second embodiment.

Specifically, processing for sectioning the "line region" LR of a character in the input image into the outline region RE and the inner region RN is firstly performed.

Furthermore, another screen processing SR2 using another screen angle θb is also performed, in addition to the above-described screen processing SR1 based on the screen angle θa. This screen processing SR2 is performed on only the outline region RE. As for pixels in the outline region RE, the processing results of the screen processing SR1 based on the screen angle θa and the screen processing SR2 based on the screen angle θb are both used.

Figure 36:
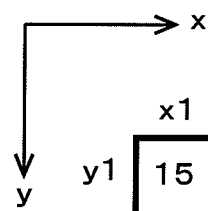
FIG. 36 is a diagram showing a screen table corresponding to the second screen angle.
Figure 37:
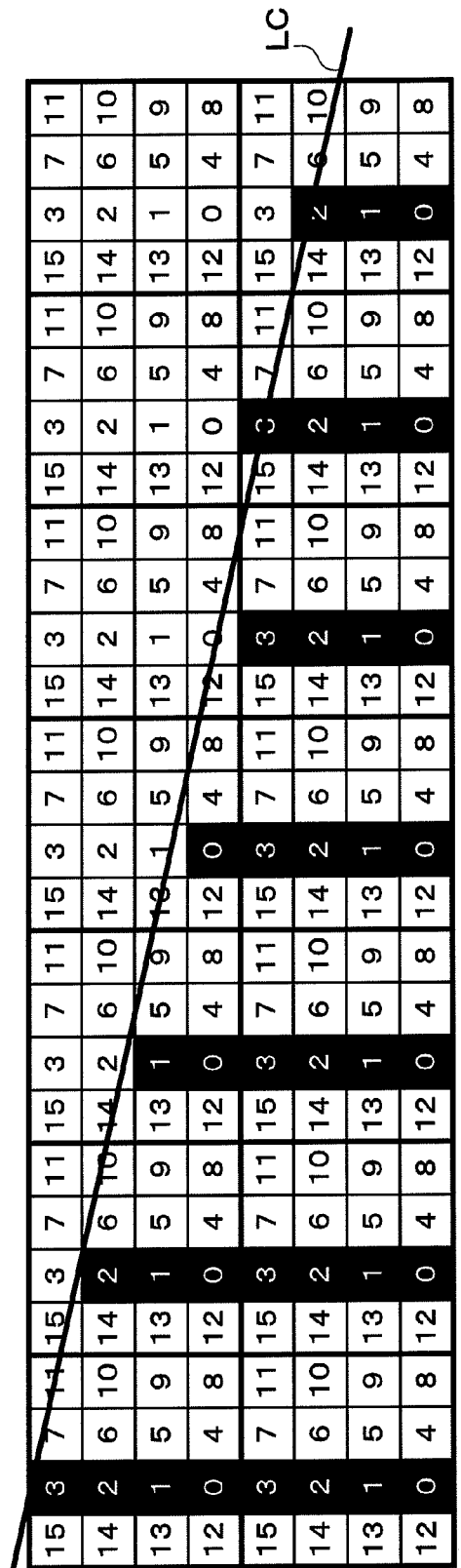
FIG. 37 is a diagram showing the result of screen processing using the second screen angle.

FIG. 36 is a diagram showing a screen table TB12 used for the screen processing using the screen angle θb. The screen table TB12 corresponds to a table obtained by rotating the screen table TB11 by 90 degrees. Using this screen table TB12 realizes the screen processing using the screen angle θb (the angle orthogonal to the screen angle θa).

Figure 38:
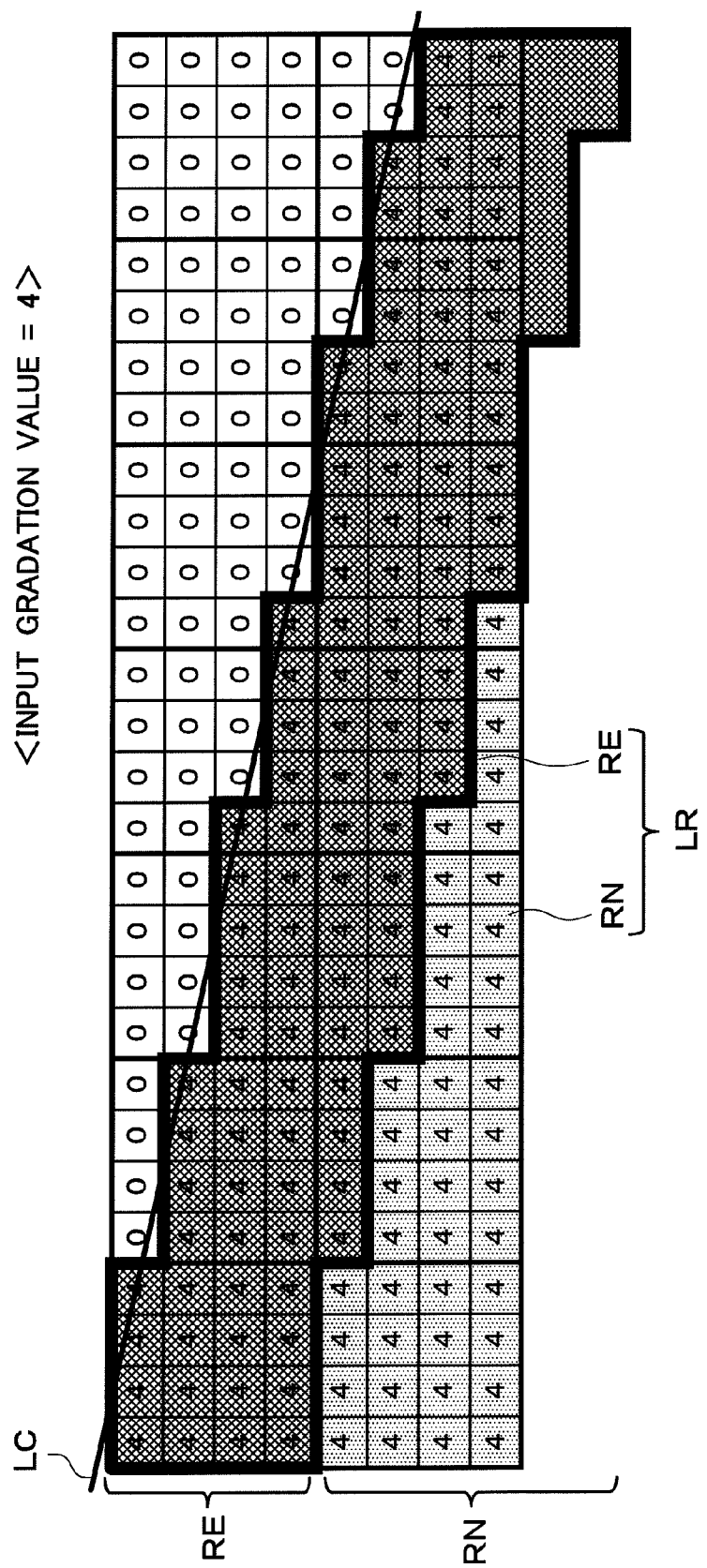
FIG. 38 is a diagram showing an outline region.

In the present embodiment, the screen processing SR2 using the screen angle θb is performed on the outline region RE (see FIG. 38). In FIG. 8, the outline region RE is shown.

Figure 39:
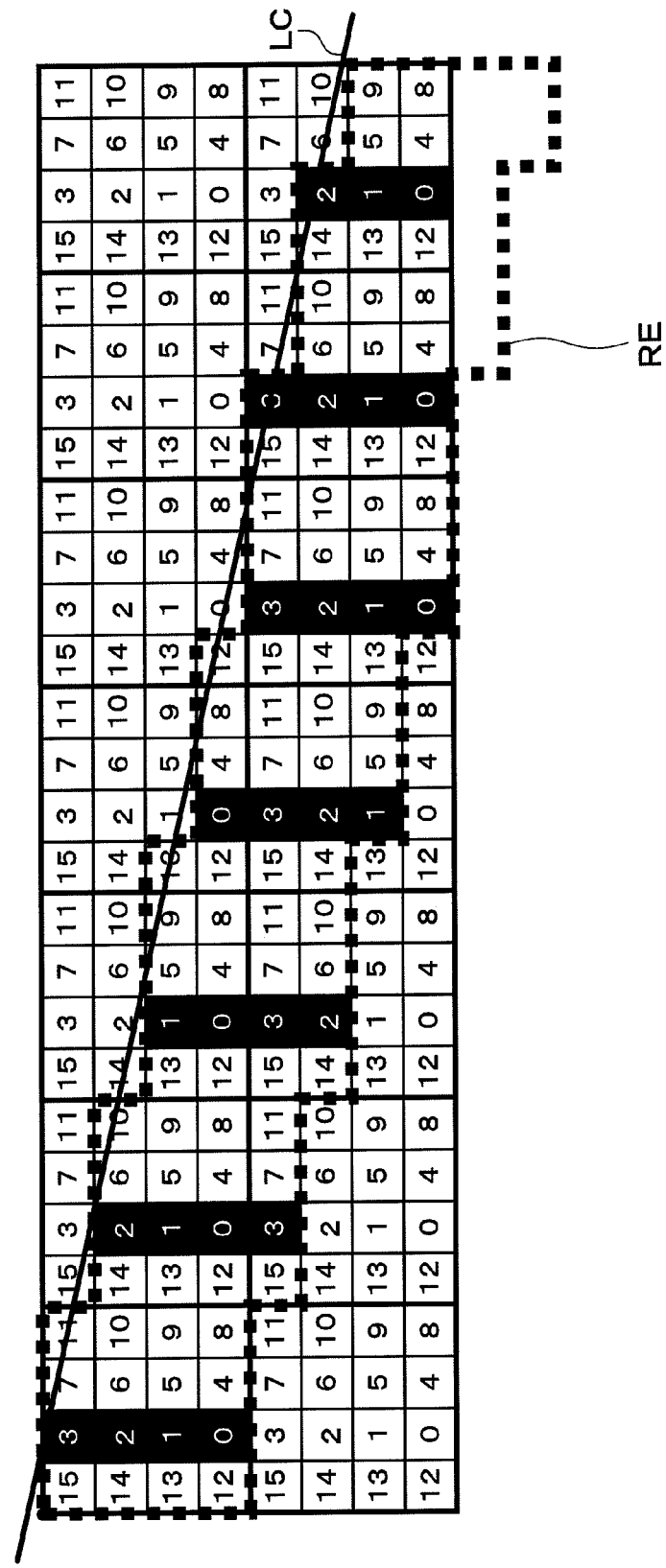
FIG. 39 is a diagram showing the result of screen processing using the second screen angle.

FIG. 39 is a diagram showing the result of the screen processing SR2 performed on the outline region RE in FIG. 38. As shown in FIG. 39, "ON"-state output pixels are successively arranged in the vertical direction in the outline region RE. Specifically, four pixels at the positions corresponding to the four reference values ("0", "1", "2", and "3") in the screen table TB2 are set to the "ON" state.

Furthermore, the processing results of the screen processing SR2 and the above-described screen processing SR1 are composited for the outline region RE. Both of the processing results are averaged before composition.

Referring to, for example, cells in the uppermost left 4×4 matrix, if all the "ON"-state pixels as a result of both of the processing results were determined directly as "ON"-state pixels, pixels whose values are larger than "4" would be set to the "ON" state and a relatively greater gradation value than originally expected would be represented.

Figure 40:
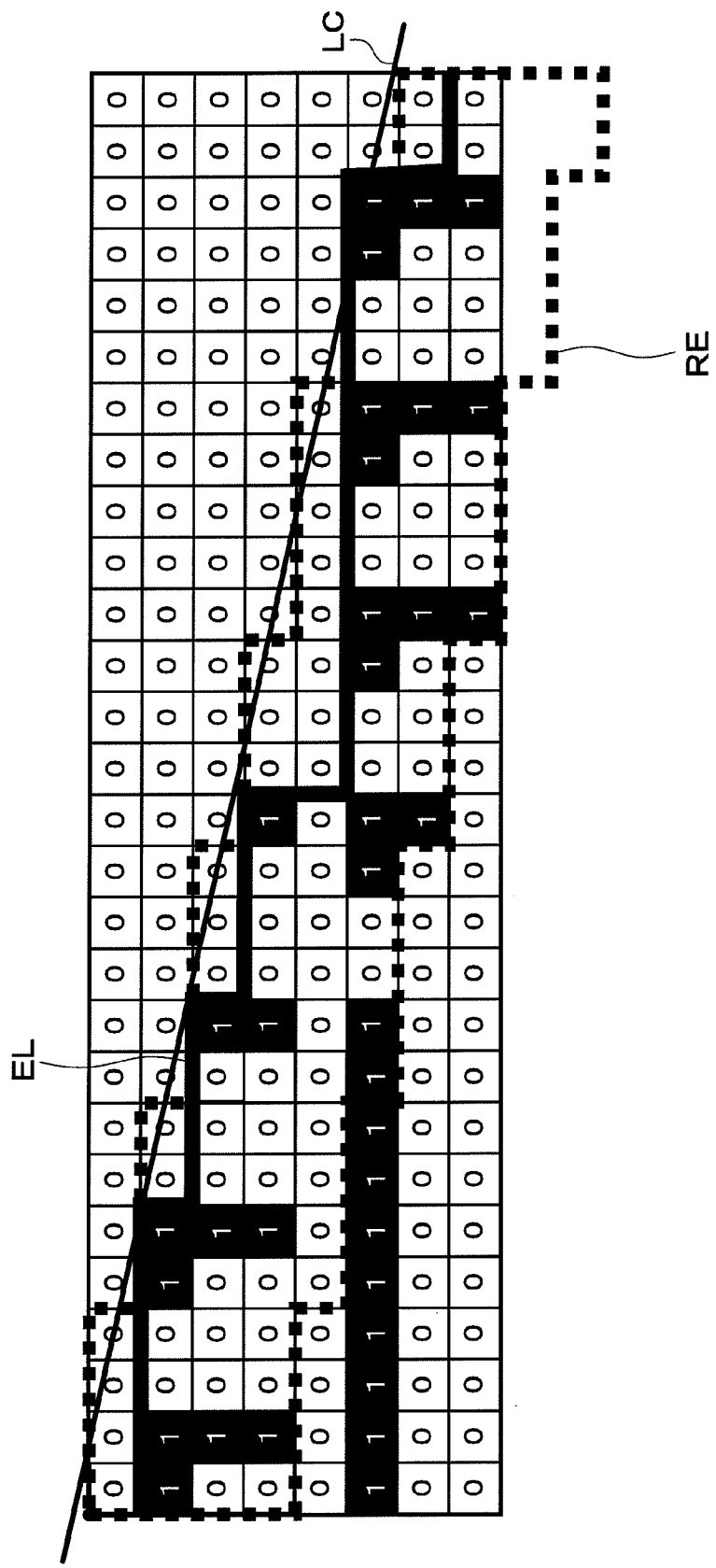
FIG. 40 is a diagram showing the result of composition processing.

For this reason, in the present embodiment, adjustment is made through the averaging processing such that, as shown in FIG. 40, only a total of four pixels are set to the "ON" state among the composited cells in the uppermost 4×4 matrix. Specifically, out of the four pixels corresponding to the four reference values ("0", "1", "2", and "3") in each of the screen tables TB11 (FIG. 31) and TB12 (FIG. 36), only two pixels corresponding to the relatively smaller reference values ("0" and "1") are set to the "ON" state. To be more specific, two pixels (x1, y2) and (x2, y2) obtained from the screen processing SR1 and two pixels (x2, y4) and (x2, y3) obtained from the screen processing SR2 are set to the "ON" state. On the other hand, the other two pixels (x3, y2) and (x4, y2) obtained from the screen processing SR1 and the other two pixels (x2, y1) and (x2, y2) obtained from the screen processing SR2 are set to the "OFF" state.

In this way, for the outline region RE, composition is performed by averaging the processing result of the screen processing SR1 and the processing result of the screen processing SR2. Accordingly, apparently similar gradation values to those obtained from only the processing result of the screen processing SR1 are obtained in a 4×4 matrix that has undergone both the screen processing SR1 and the screen processing SR2.

Furthermore, a similar operation is performed at each position in the outline region RE. As a result, an "apparent outline" as indicated by the extra thick line EL in FIG. 40 appears. Compared to FIG. 35, it can be seen that "jagged edges" (jaggies) are suppressed.

Meanwhile, for pixels in the inner region RN, only the processing result of the screen processing SR1 is used, out of the processing results of both the screen processing SR1 and the screen processing SR2. Accordingly, similar screen processing to that in FIG. 35 is performed on the pixels in the inner region RN.

Through the above-described operation, a similar effect to that of the first embodiment can also be achieved in the binary screen processing.

3. Third Embodiment

3-1. Overview

A third embodiment describes a technique for detecting a tilt angle θc of a line segment region in the line region LR of a character and performing screen processing on that line segment region using a screen angle θd whose difference from the tilt angle θc is closest to a predetermined angle (here, 45 degrees).

Figure 41:
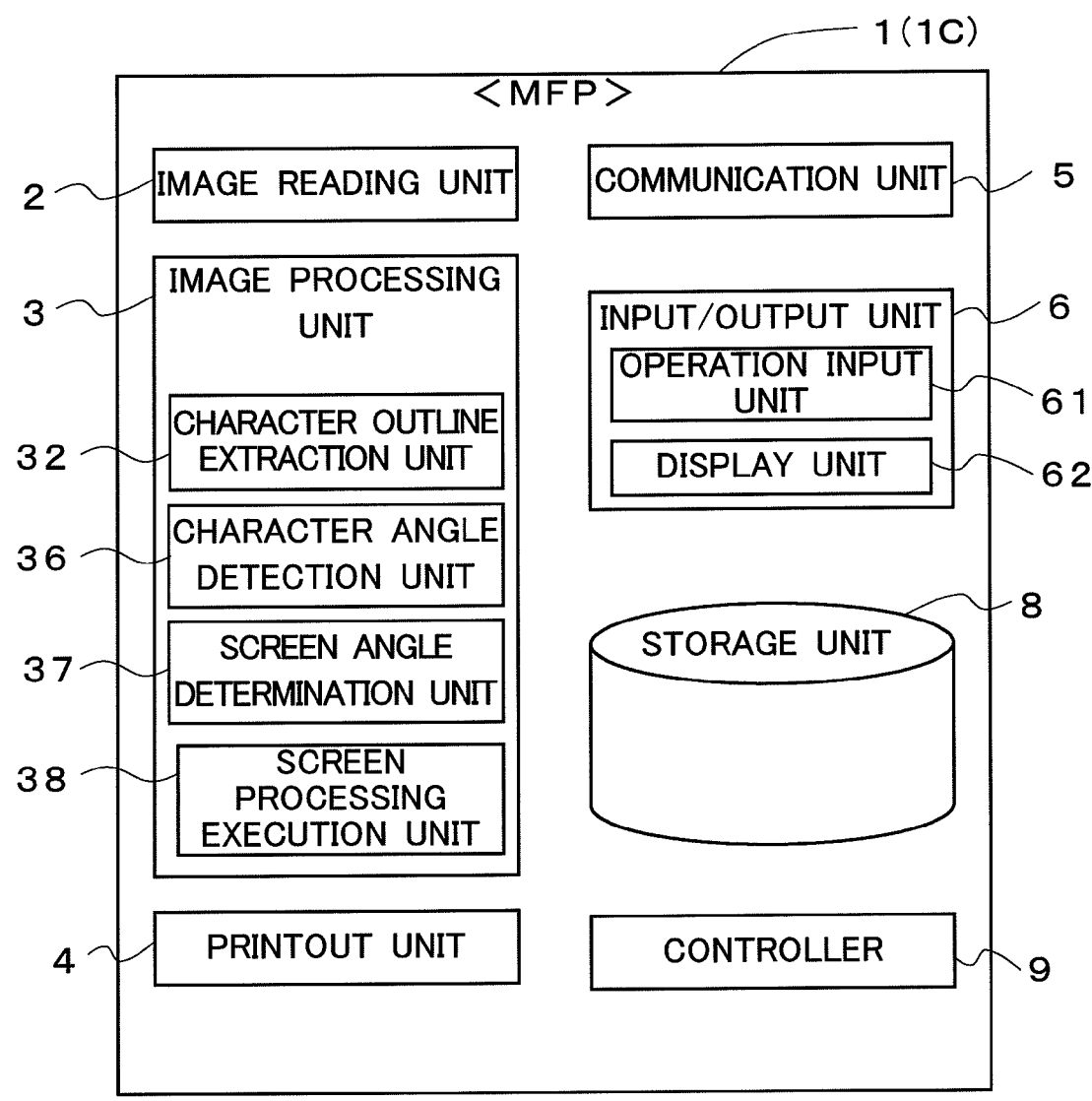
FIG. 41 is a schematic diagram showing a configuration of an image processing apparatus according to a third embodiment.

FIG. 41 is a functional block diagram of an image processing apparatus 1 (1C) according to the third embodiment.

As shown in FIG. 41, an image processing unit 3 includes a character outline extraction unit 32, a character angle detection unit 36, a screen angle determination unit 37, and a screen processing execution unit 38.

The character outline extraction unit 32 extracts an outline region of a character as well as detecting a line region of the character, and sections the line region of the character into the outline region and an inner region enclosed in the outline region. Note that a thin portion (thin-line portion) of a character includes no inner region and is constituted by only the outline region, so that the character outline extraction unit 32 extracts a thin-line portion of a character as the outline region.

The character angle detection unit 36 is a processing unit that detects the tilt angle θc of the line region LR of a character (to be specific, the tilt angle of the outline region of the line region LR).

The screen angle determination unit 37 is a processing unit that selects, from among multiple screen angles θi (e.g., angles θ1 to θ5) prepared in advance, a screen angle θd whose difference from the tilt angle θc of the line region LR of the character is closest to a predetermined angle (here, 45 degrees).

The screen processing execution unit 38 is a processing unit that performs screen processing on a line segment region of the line region LR of a character, using the screen angle θd selected from among the multiple screen angles θi.

3-2. Image Processing

As in the first and second embodiments, this image forming apparatus realizes gradation representation by performing screen processing on each plane image on a page including a character. Note that different screen angles θa are fundamentally employed for different plane images in order to avoid interference of the plane images.

As mentioned above, in the case where a difference between the outline angle of a character and the screen angle θa is relatively small, there is the problem that jaggies are noticeable. This problem can also be solved with the third embodiment.

Also, in particular in the case where the outline of a character having an intermediate gradation value is thin, that thin line may disappear depending on the positional relationship between the screen matrix reference table (screen table) and the thin line.

For example, assume the case where a vertical thin line having an input gradation value of "30" exists in only the third column from the left, as shown in FIG. 44. In this case, if the screen table TB1 similar to that in FIG. 8 is employed, the input gradation values are compared with the respective reference values Dref of "223", "32", "96", and "159" in the third column from the left. Since the input gradation value of "30" is smaller than any of the reference values in the third column, as shown in FIG. 45, the output gradation values at every position of a cell in the matrix will be "0". That is, the thin line disappears.

If the vertical thin line having an input gradation value of "30" was present in the first column from the left, the input gradation value of "30" at a position PG1 in the second row from the top and the first column from the left exceeds the corresponding reference value Dref of "0". Thus, an "ON"-state pixel is drawn at that position PG1. In this case, a situation where the thin line disappears is avoided, although the substantial gradation value of the thin line is reduced.

However, in the case where a vertical thin line having an input gradation value of "30" is present in the third column from the left as mentioned above, the thin line disappears.

Assume also, for example, the case where a vertical thin line having an input gradation value of "30" is present in only the first row from the top as shown in FIG. 47. In this case, if the screen table TB1 similar to that in FIG. 8 is employed, the input gradation values are compared with the respective corresponding reference values Dref of "191", "207", "223", and "239" in the first row from the top. Since the input gradation value of "30" is smaller than any of the reference values in the first row, as shown in FIG. 45, the output gradation value at every position of a cell in the matrix will be "0". That is, the thin line disappears.

Such a situation can also occur in the case of employing the screen table TB2 similar to that in FIG. 22.

Assume, for example, the case where the screen table TB2 similar to that in FIG. 22 is employed and a vertical thin line having an input gradation value of "30" is present in only the first row from the top (see FIG. 47). In this case, the input gradation values are compared with the respective corresponding reference values Dref of "239", "48", "112", and "175" in the first row from the top. Since the input gradation value of "30" is smaller than any of the reference values Dref in the first row, as shown in FIG. 46, the output gradation value at every position of a cell in the matrix becomes "0". That is, the thin line disappears.

Similarly, assume the case where the screen table TB2 (see FIG. 22) is employed and a vertical thin line having an input gradation value of "30" is present in only the third column from the left (see FIG. 44). In this case, the input gradation values are compared with the respective corresponding reference values Dref of "112", "96", "80", and "64" in the third column from the left. Since the input gradation value of "30" is smaller than any of the reference values Dref in the third column from the left, as shown in FIG. 46, the output gradation value at every position of a cell in the matrix will be "0". That is, the thin line disappears.

In this way, there is a relatively high possibility that a thin line will disappear in the case where a difference between the angle of the thin line (in other words, the angle of a line segment region of the character outline) and the screen angle is 0 degrees or 90 degrees.

In view of this, in the third embodiment, an angle whose difference from the angle of the thin line (in other words, the angle of the line segment region of the character outline) θc is close to a predetermined angle θe (here, 45 degrees) is employed as the screen angle θd. Then, screen processing using the screen angle θd is performed on the outline portion (outline region RE) of the character.

FIG. 48 shows a screen table TB3 that realizes a screen angle of −45 degrees (hereinafter, simply represented as "45 degrees" with the negative sign omitted). For example, if screen processing using such a screen table TB3 is performed on a uniform region having a gradation value of "30", the processing result as shown in FIG. 49 is obtained. In FIG. 49, output pixels at the positions corresponding to the reference values of "0", "8", "16", and "24" arranged in the 45-degree direction are set to the "ON" state.

If the vertical thin line having a gradation value of "30" (see FIG. 44) is subjected to screen processing using such a screen table TB3, the processing result as shown in FIG. 50 is obtained. FIG. 50 shows that the gradation value of "30" at the position in the third row from the top and the third column from the left exceeds the corresponding reference value Dref of "16", and therefore, the output pixel at that position is set to the "ON" state. Accordingly, as can be seen from a comparison with FIG. 45 (or FIG. 46), a situation where the thin line disappears is avoided.

Similarly, if the horizontal thin line having a gradation value of "30" (see FIG. 47) is subjected to screen processing using such a screen table TB3, the processing result as shown in FIG. 51 is obtained. FIG. 51 shows that the gradation value of "30" at a position in the first row from the top and the first column from the left exceeds the corresponding reference value Dref of "0", and therefore, the output pixel at that position is set to the "ON" state. Accordingly, as can be seen from a comparison with FIG. 45 (or FIG. 46), a situation where the thin line disappears is avoided.

Performing such processing makes it possible to suppress a situation where a thin line disappears as a result of screen processing. In particular, the possibility that a thin line will disappear can be minimized by performing screen processing using an angle that corresponds to a 45-degree tilt angle with respect to the direction of extension of the thin line in the input image.

Further details of such processing will be discussed below.

In the third embodiment as well, the processing for sectioning the "line region" LR (see FIG. 25) of a character in an input image into the outline region RE and the inner region RN is performed as in the first embodiment and the like. Then, for the inner region RN, screen processing using the normal screen angle $\theta a$ is performed as in the first embodiment and the like.

On the other hand, for the outline region RE, each process described below is performed.

First, the character outline extraction unit 32 sections the outline region RE in the line region LR of a character into multiple partial regions (also referred to as "segments"). Then, the character angle detection unit 36 detects the tilt angle $\theta c$ of the outline region RE in the line region LR of the character (the tilt angle $\theta c$ of an edge portion of the line region LR). Here, the tilt angle $\theta c$ of the outline region RE is detected for each partial region of the outline region RE.

Specifically, a direction detection filter FT1 as shown in FIG. 43, for example, is used to detect the tilt angle $\theta c$. In FIG. 43, the image processing filter FT1 that detects a 45-degree direction outline is shown.

The filter FT1 has an M-by-M pixel size in which the center pixel and pixels existing in both upper-right and lower-left directions from that center pixel have a pixel value of "1", and the other pixels have a pixel value of "0". The filter FT1 has the characteristic of calculating a high value for a line that extends in a 45-degree diagonal direction.

By applying such an image filter to the outline region RE in an input image and, for example, determining whether or not the calculation result is greater than or equal to a predetermined value, it is possible to determine whether the angle of the outline region (the angle of the outline of a character) is 45 degrees or not (in other words, to detect a 45-degree outline).

Note that other angles may also be detected using other image processing filters for detecting respective angles.

Figure 42:
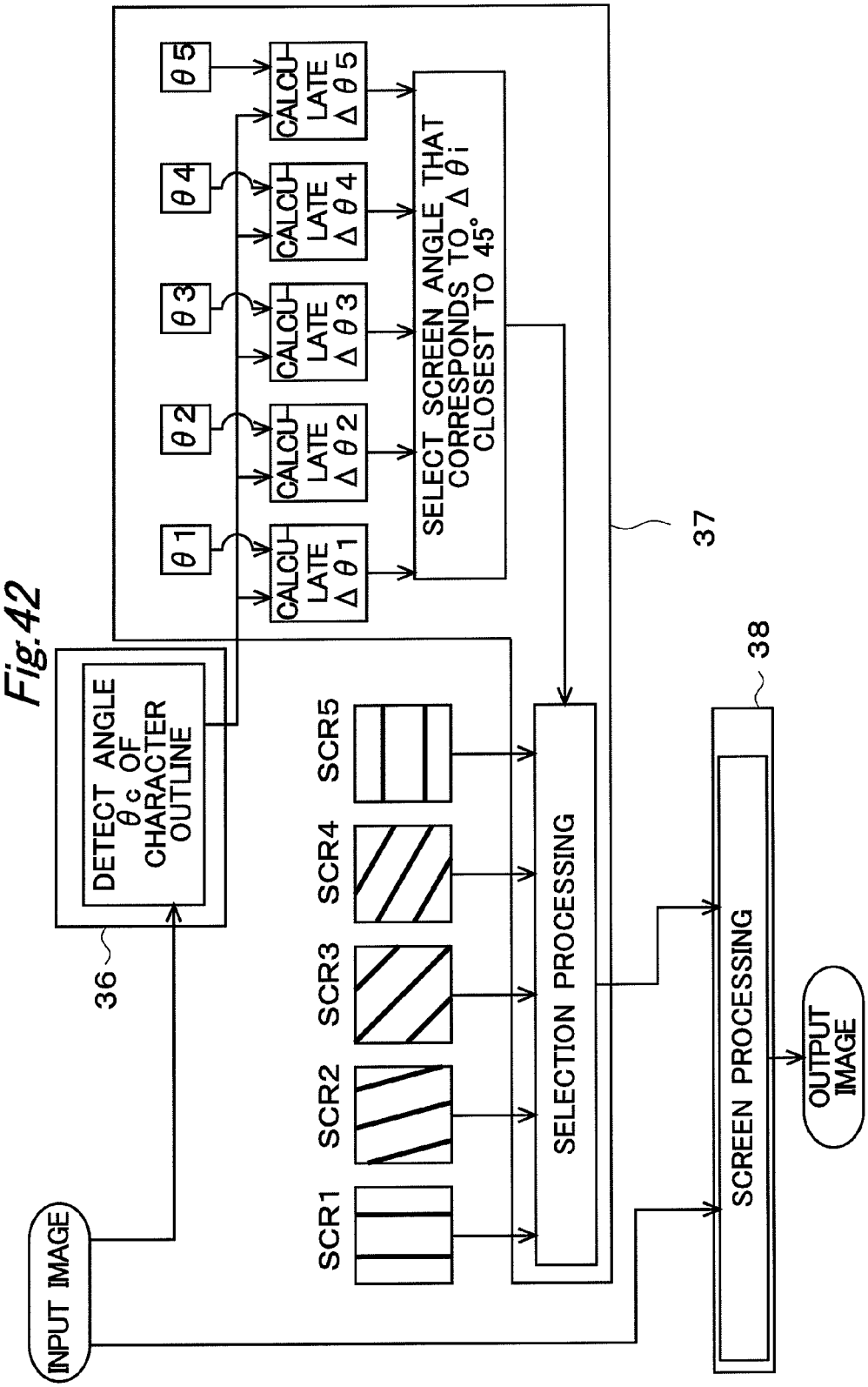
FIG. 42 is a schematic diagram showing a configuration of an image processing unit according to the third embodiment.

Next, the screen angle determination unit 37 selects, from among multiple screen angles $\theta i$ prepared in advance, a screen angle $\theta d$ whose difference from the tilt angle $\theta c$ of the line region LR of the character is closest to a predetermined angle (45 degrees). This processing for selecting the screen angle $\theta d$ is performed for each partial region of the outline region RE. Assume here that multiple (five) screen tables SCR1 to SCR5 (see FIG. 42) are provided in advance. Each of the screen tables SCR1 to SCR5 is for implementing screen processing with each of the screen angles $\theta i$ (e.g., $\theta 1$ being 90 degrees, $\theta 2$ being 75 degrees, $\theta 3$ being 45 degrees, $\theta 4$ being 30 degrees, and $\theta 5$ being 0 degrees). For example, the aforementioned screen table TB1 (FIG. 8) is used as the screen table SCR5, and the aforementioned screen table TB2 (FIG. 22) is used as the screen table SCR1. Also, the screen table TB3 (FIG. 48) is used as the screen table SCR3.

Specifically, a difference value $\Delta\theta i$ between the tilt angle $\theta c$ of the character and each of the screen angles $\theta i$ corresponding to the multiple screen tables SCRi is calculated. Each difference value $\Delta\theta i$ is calculated to be a value in the range of 0 to 90 degrees. From among these difference values $\Delta\theta i$, a screen angle $\theta j$ of a screen table SCRj that corresponds to a difference value closest to a predetermined value $\theta e$ (here, 45 degrees) is determined as the screen angle $\theta d$ to be used, in each case. For example, if the difference value $\Delta\theta 3$ is closest to 45 degrees from among the multiple difference values $\Delta\theta i$, the angle $\theta 3$ corresponding to the screen table SCR3 is determined as the screen angle $\theta d$. To be more specific, for vertical and horizontal thin lines, the angle $\theta 3$ corresponding to the screen table SCR3 is determined as the screen angle $\theta d$. Also, for 45-degree thin lines, the angle $\theta 1$ corresponding to the screen table SCR1 (or the angle $\theta 5$ corresponding to the screen table SCR5) is determined as the screen angle $\theta d$.

Then, screen processing is performed using the screen table SCR corresponding to the selected screen angle $\theta d$, and as a result, an output image is generated. To be specific, screen processing using the screen angle $\theta d$ determined for each of the multiple partial regions is performed on each of these partial regions, and as a result, an output image is generated.

With the operation as described above, screen processing for the outline region RE is performed using the screen angle $\theta d$ whose difference from the tilt angle $\theta c$ of a character is close to 45 degrees. This makes it possible to resolve the problem that jaggies are noticeable in the case where the difference between the outline angle of a character and the screen angle $\theta a$ is relatively small (e.g., the case where the difference between both angles is approximately 20 degrees or less). In particular, screen processing is performed for each partial region of the outline of a character, using the screen angle $\theta d$ whose difference from the tilt angle of each partial region is close to 45 degrees. Accordingly, jaggies appearing in character outlines having various angles can be suppressed.

Furthermore, screen processing is performed using the screen angle $\theta d$ whose difference from the tilt angle $\theta c$ of a character is close to 45 degrees. Accordingly, it is possible to minimize the possibility that a thin line will disappear.

Meanwhile, for pixels in the inner region RN, the processing result of the screen processing SR1 using the predetermined screen angle θa is utilized as is to generate an output image. The screen angle θa is determined as appropriate for each plane image. Accordingly, for the inner region RN, it is possible to favorably avoid interference of multiple plane images (the occurrence of moire or the like).

Note that although the angle θe is 45 degrees in the third embodiment, the present invention is not limited thereto, and a predetermined value in the range of 40 to 50 degrees or a predetermined value in the range of 30 to 60 degrees, for example, may be employed as the angle θe.

3. Variations

While the above has been a description of embodiments of the present invention, the present invention is not intended to be limited to those described above.

For example, although the above embodiments illustrate the case where part of the processing is implemented by the hardware of the image processing unit 3, the present invention is not limited thereto, and processing similar to the above may be implemented by only a program (software) executed by the controller 9. To be more specific, the controller 9 of the MFP 1 may realize the functionality similar to that of the image processing unit 3 in the above embodiments by reading out a predetermined program PG from various types of non-transitory (or portable) computer-readable storage media 91 (such as a USB memory), on which such a program has been recorded, and then executing that program PG using a CPU or the like. Note that although the above program may be supplied via a storage medium, it may also be supplied by downloading it via the Internet.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. An image processing apparatus comprising a hardware processor configured to:
    perform a first screen dither processing on an outline region of a line region of a character using a first screen angle resulting in a first screen dither processing result of pixel data;
    perform a second screen dither processing on the outline region on which the first screen dither processing is performed using a second screen angle resulting in a second screen dither processing result of pixel data wherein the second screen angle is different from the first screen angle; and
    composite the first screen dither processing result and the second screen dither processing result for the outline region of a same color plane image that has undergone the first screen dither processing and the second screen dither processing;
    the processor is configured to output, for only the outline region out of the line region, a value obtained by the compositing the first screen dither processing result and the second screen dither processing result, as an output gradation value, and
    the processor is configured to output, for an inner region enclosed by the outline region, the first screen dither processing result of the first screen dither processing as a second output gradation value.

2. The image processing apparatus according to claim 1, wherein
    The processor is configured to composite the first screen dither processing result and the second screen dither processing result for the outline region by averaging the first screen dither processing result and the second screen dither processing result.

3. The image processing apparatus according to claim 2, wherein
    the processor is further configured to composite the first screen dither processing result and the second screen dither processing result for the outline region by
    halving the first screen dither processing result to produce a first screen processing halved result,
    halving the second screen dither processing result to produce a second screen processing halved result, and
    adding the first screen processing halved result and the second screen processing halved result.

4. The image processing apparatus according to claim 1, wherein the second screen angle is an angle orthogonal to the first screen angle.

5. The image processing apparatus according to claim 1, wherein
    the processor is configured to specify, for the character, the outline region and an inner region enclosed by the outline region.

6. The image processing apparatus according to the claim 5, wherein
    The processor also is configured to perform the first screen dither processing on the inner region that has been specified, and output only the first screen processing result for the inner region.

7. An image processing method comprising the steps of:
    a) performing first screen dither processing using a first screen angle on a line region of a character;
    b) performing second screen dither processing using a second screen angle on at least an outline region out of the line region, the second screen angle being different from the first screen angle;
    c) performing composition of pixel data resulting from the first screen processing and pixel data resulting from the second screen processing, on at least the outline region of a same color plane image out of the line region;
    d) outputting, for only the outline region out of the line region, a value obtained by the composition of the pixel data from the first screen dither processing and the pixel data from the second screen dither processing, as an output gradation value, and
    e) outputting, for an inner region enclosed by the outline region, the pixel data result of the first screen dither processing as a second output gradation value.

8. A non-transitory computer-readable storage medium storing a program for causing a computer to execute the steps of:
    a) performing first screen dither processing using a first screen angle on a line region of a character;
    b) performing second screen dither processing using a second screen angle on at least an outline region out of the line region, the second screen angle being different from the first screen angle;
    c) performing composition of pixel data resulting from the first screen processing and pixel data resulting from the second screen processing, on at least the outline region of a same color plane image out of the line region;

d) outputting, for only the outline region out of the line region, a value obtained by the composition of the pixel data from the first screen dither processing and the pixel data from the second screen dither processing, as an output gradation value, and
e) outputting, for an inner region enclosed by the outline region, the pixel data result of the first screen dither processing as a second output gradation value.

\* \* \* \* \*